(12) United States Patent
Lee et al.

(10) Patent No.: US 11,237,683 B2
(45) Date of Patent: Feb. 1, 2022

(54) DISPLAY DEVICE

(71) Applicant: Samsung Display Co., Ltd., Yongin-si (KR)

(72) Inventors: Soo Jung Lee, Suwon-si (KR); Suk Kim, Hwaseong-si (KR); Ki Seo Kim, Yongin-si (KR); Yu Na Kim, Seoul (KR); Keum Dong Jung, Seoul (KR); Go Eun Cha, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/830,015

(22) Filed: Mar. 25, 2020

(65) Prior Publication Data

US 2021/0026497 A1 Jan. 28, 2021

(30) Foreign Application Priority Data

Jul. 23, 2019 (KR) .......................... 10-2019-0088967

(51) Int. Cl.
*G06F 3/044* (2006.01)

(52) U.S. Cl.
CPC .......... *G06F 3/0446* (2019.05); *G06F 3/0448* (2019.05)

(58) Field of Classification Search
CPC .............................. G06F 3/0446; G06F 3/0448

USPC ........................................................... 345/174
See application file for complete search history.

(56) References Cited

U.S. PATENT DOCUMENTS

| 8,988,086 B1* | 3/2015 | Peterson | G06F 3/0446 324/679 |
|---|---|---|---|
| 2013/0135328 A1* | 5/2013 | Rappoport | G06F 3/0481 345/522 |
| 2015/0060256 A1* | 3/2015 | Kim | G06F 3/044 200/600 |
| 2016/0041663 A1* | 2/2016 | Chen | G09G 3/32 345/174 |
| 2016/0259448 A1* | 9/2016 | Guarneri | G06F 3/0418 |
| 2018/0348906 A1* | 12/2018 | Hwang | G06F 3/044 |
| 2018/0366495 A1* | 12/2018 | Xu | G06F 3/0412 |

FOREIGN PATENT DOCUMENTS

JP 2011059771 A * 3/2011

* cited by examiner

*Primary Examiner* — Mark Edwards
(74) *Attorney, Agent, or Firm* — Lewis Roca Rothgerber Christie LLP

(57) ABSTRACT

A display device includes: a display panel which includes a first area and a second area; and a sensor device which overlaps the first area in a thickness direction of the display panel. The display panel includes first sensor electrodes in the first area and second sensor electrodes in the second area, and a shape of a first sensor electrode of the first sensor electrodes is different from a shape of a second sensor electrode of the second sensor electrodes.

20 Claims, 17 Drawing Sheets

FIG. 18
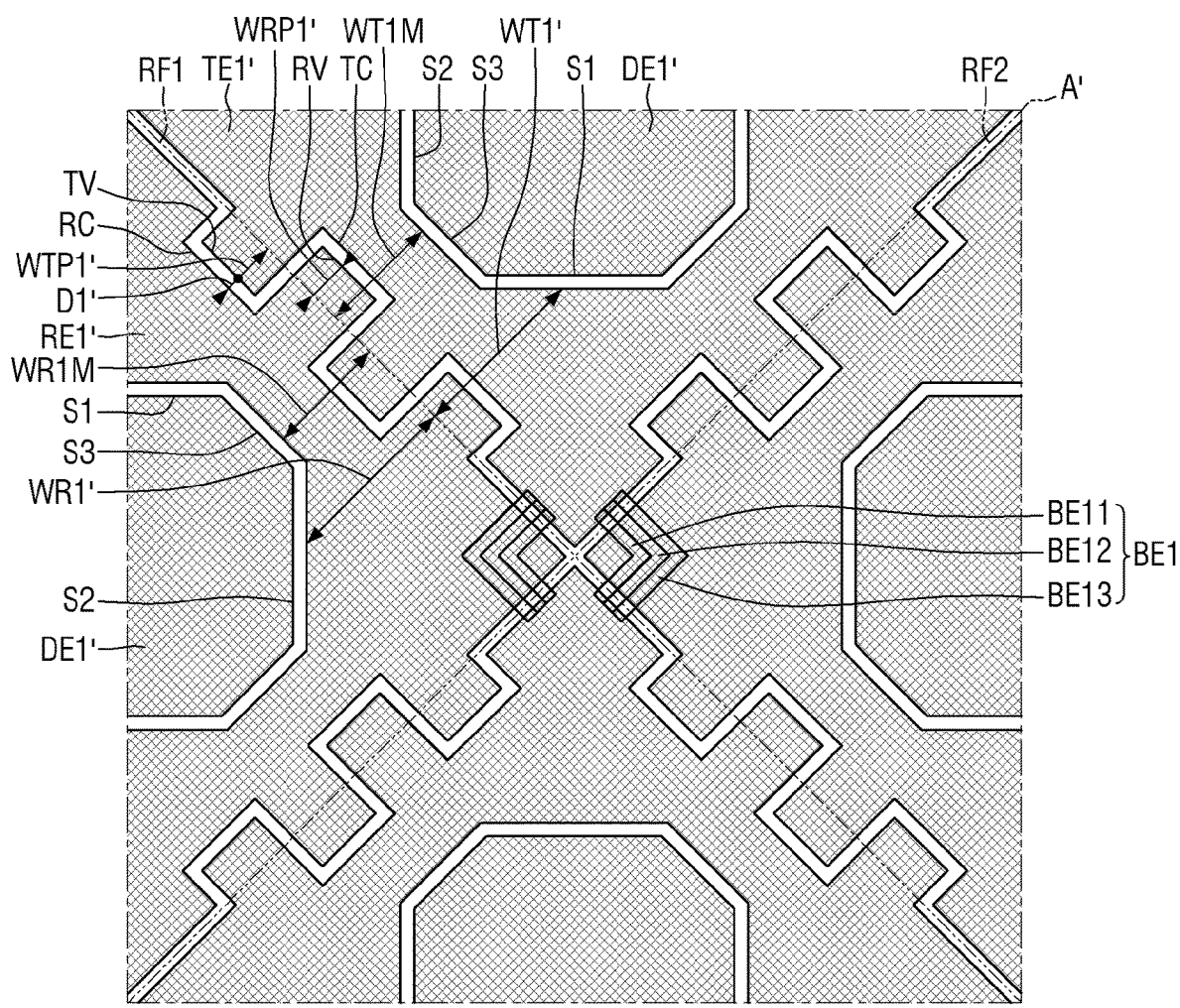
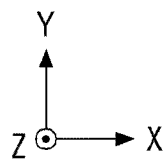

DISPLAY DEVICE

CROSS-REFERENCE TO RELATED APPLICATION

This application claims priority to and the benefit of Korean Patent Application No. 10-2019-0088967, filed on Jul. 23, 2019, in the Korean Intellectual Property Office, the entire content of which is incorporated herein by reference.

BACKGROUND

1. Field

Aspects of embodiments of the present disclosure relate to a display device.

2. Description of the Related Art

As the information society develops, the demand for display devices for displaying images is increasing in various forms. For example, display devices are being applied to various electronic devices such as smartphones, digital cameras, notebook computers, navigation devices, and televisions.

With the application of display devices to various electronic devices, there is a demand for display devices having various functions. For example, recently, skin moisture meters capable of measuring the skin moisture of a person are widely used. Therefore, applying a function of measuring the skin moisture of a user to display devices is suggested. However, because a skin moisture meter includes an exposed electrode that contacts a user's skin, it is difficult to apply the skin moisture meter to display devices in their existing forms.

SUMMARY

Aspects of example embodiments of the present disclosure are directed to a display device which can measure the skin moisture of a user.

Aspects of example embodiments of the present disclosure are also directed to a display device in which a boundary between a first area where a sensor device is arranged and a second area is prevented from being visible or the visibility thereof is reduced.

However, example embodiments of the present disclosure are not restricted to those set forth herein. The above and other example embodiments of the present disclosure will become more apparent to one of ordinary skill in the art to which the present disclosure pertains by reference to the detailed description of the present disclosure given below.

According to some example embodiments of the present disclosure, a display device includes a display panel which includes a first area and a second area; and a sensor device which overlaps the first area in a thickness direction of the display panel. The display panel includes first sensor electrodes in the first area and second sensor electrodes in the second area, and a shape of a first sensor electrode of the first sensor electrodes is different from a shape of a second sensor electrode of the second sensor electrodes.

In some embodiments, an edge of the first sensor electrode may include a plurality of bent portions.

In some embodiments, the first sensor electrode may include protrusions protruding from a first reference line and recesses recessed from the first reference line.

In some embodiments, the first reference line may cross a second reference line, and each of the first reference line and the second reference line may be a virtual straight line, and a crossing where the first reference line and the second reference line cross each other may be between the first sensing electrodes adjacent in a first direction and between the first driving electrodes adjacent in a second direction crossing the first direction.

In some embodiments, the protrusions and the recesses may face each other.

In some embodiments, a length by which the protrusions protrude from the first reference line may be about 100 μm to about 600 μm.

In some embodiments, edges of the second sensor electrodes may be parallel to the first reference line.

In some embodiments, the first sensor electrodes may include first driving electrodes and first sensing electrodes, the second sensor electrodes may include second driving electrodes and second sensing electrodes, and a first distance between each of the first driving electrodes and an adjacent first sensing electrode may be smaller than a second distance between each of the second driving electrodes and an adjacent second sensing electrode.

In some embodiments, the display device may further include first connection electrodes which connect first driving electrodes adjacent in a second direction; and second connection electrodes which connect second driving electrodes adjacent in a second direction. Each first connection electrode may include two or more first sub-connection electrodes, each second connection electrode may include one or more second sub-connection electrodes, and the number of the first sub-connection electrodes of each first connection electrode may be greater than the number of the second sub-connection electrodes of the second connection electrode.

In some embodiments, the display device may further include first conductive patterns which are electrically isolated from the first sensor electrodes; and second conductive patterns which are electrically isolated from the second sensor electrodes.

In some embodiments, the first conductive patterns may be surrounded by the first sensor electrodes, and the second conductive patterns may be surrounded by the second sensor electrodes.

In some embodiments, an area of each of the first conductive patterns may be larger than an area of each of the second conductive patterns.

According to some example embodiments of the present disclosure, a display device includes a display panel which includes a first area and a second area; and a sensor device which overlaps the first area in a thickness direction. The display panel includes first sensor electrodes in the first area and second sensor electrodes in the second area, and values of a first mutual capacitance of the first sensor electrodes are different from values of a second mutual capacitance of the second sensor electrodes.

In some embodiments, a skin moisture level may be calculated by detecting a voltage charged in the first mutual capacitance.

In some embodiments, the values of the first mutual capacitance may be greater than the values of the second mutual capacitance.

In some embodiments, the display device may further include first pixels which are in the first area. The first area further may include a transmitting portion not overlapping the first pixels.

In some embodiments, the transmitting portion may be surrounded by the first pixels.

In some embodiments, the sensor device may overlap the transmitting portion in the thickness direction.

In some embodiments, the display device may further include second pixels which are in the second area. The number of the first pixels per unit area in the first area may be smaller than the number of the second pixels per unit area in the second area.

In some embodiments, each of the first and second pixels may include a first electrode, a pixel defining layer having an opening that exposes the first electrode, a light emitting layer on the first electrode, and a second electrode on the light emitting layer.

In some embodiments, an area of the first area may be smaller than an area of the second area.

According to the aforementioned and other example embodiments of the present disclosure, because first sensor electrodes for measuring skin moisture include bent portions, the sensitivity of the first sensor electrodes may be improved. Therefore, a user's skin moisture level can be determined more accurately.

In addition, the first sensor electrodes in a first area have a different shape than the shape of the second sensor electrodes in a second area. Therefore, it is possible to minimize or reduce a phenomenon in which a boundary between the first area and the second area is visible due to a difference in pixel density between the first area and the second area.

Other features and example embodiments may be apparent from the following detailed description, the drawings, and the claims.

BRIEF DESCRIPTION OF THE DRAWINGS

The above and other example embodiments and features of the present disclosure will become more apparent by describing example embodiments thereof with reference to the attached drawings, in which:

FIG. 18 is an enlarged view of area A of FIG. 11, according to some embodiments.

DETAILED DESCRIPTION

Embodiments of the present disclosure will now be described more fully hereinafter with reference to the accompanying drawings, in which some embodiments of the present disclosure are shown. The subject matter of this disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions may be exaggerated for clarity.

Hereinafter, embodiments of the present disclosure will be described with reference to the attached drawings.

Figure 1:
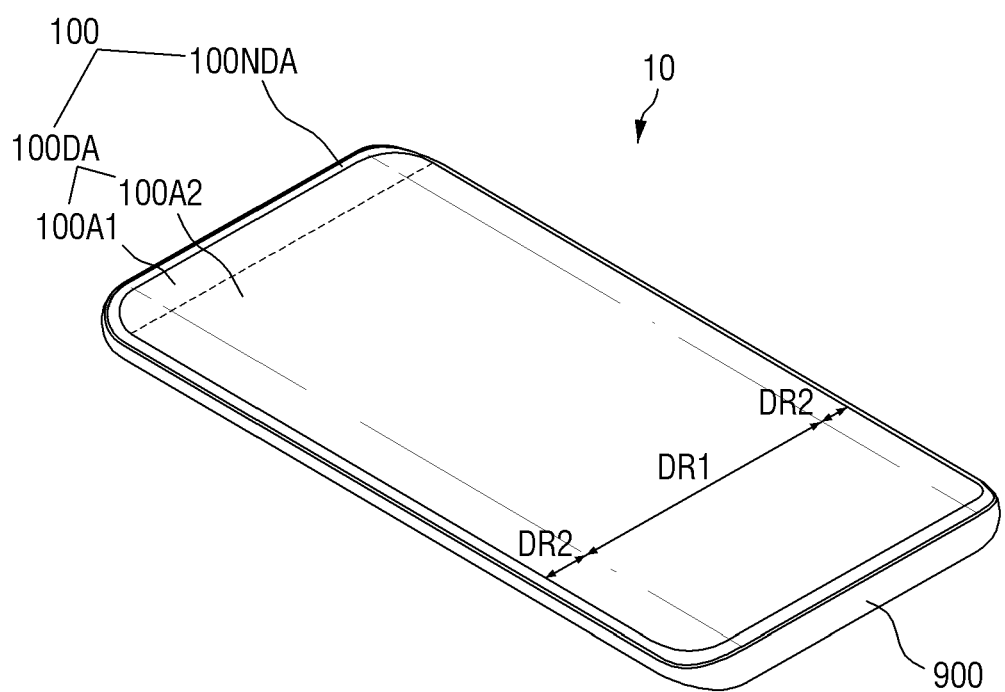
FIG. 1 is a perspective view of a display device, according to some embodiments.
Figure 2:
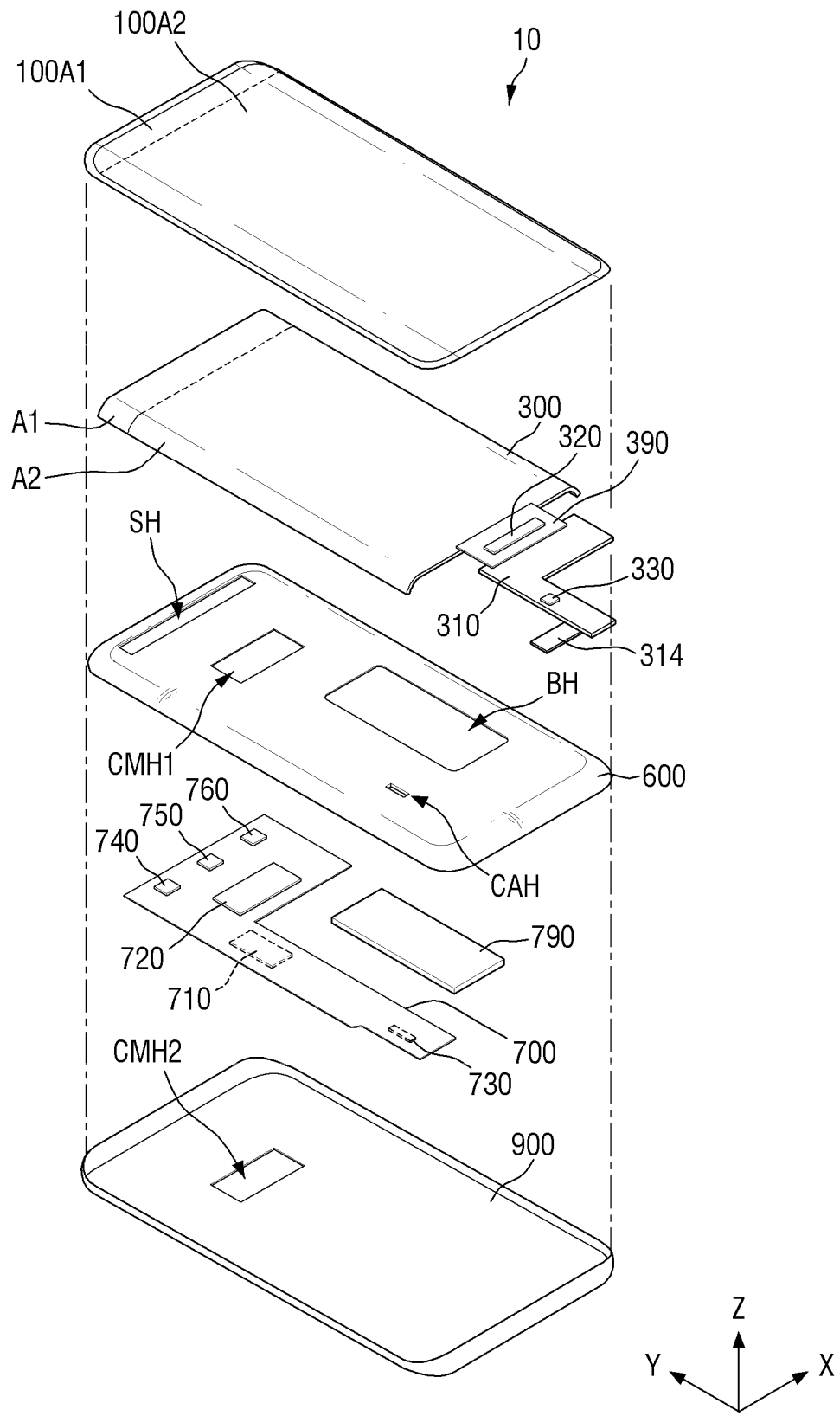
FIG. 2 is an exploded perspective view of the display device, according to some embodiments.

FIG. 1 is a perspective view of a display device 10 according to some embodiments. FIG. 2 is an exploded perspective view of the display device 10 according to some embodiments.

Referring to FIGS. 1 and 2, the display device 10, according to some embodiments, is a device for displaying moving images or still images. The display device 10 may be used as a display screen in portable electronic devices such as mobile phones, smartphones, tablet personal computers (PCs), smart watches, watch phones, mobile communication terminals, electronic notebooks, electronic books, portable multimedia players (PMPs), navigation systems and ultra-mobile PCs (UMPCs), as well as in any other suitable product, such as, for example, televisions, notebook computers, monitors, billboards, and Internet of things (IoT) devices.

The display device 10, according to some embodiments, includes a cover window 100, a display panel 300, a display circuit board 310, a display driver circuit 320, a sensor driver 330, a bracket 600, a main circuit board 700, a battery 790, and a bottom cover 900.

In the present specification, the terms "above" and "upper" indicate a direction in which the cover window 100 is arranged with respect to the display panel 300, such as, for example, a Z-axis direction, and the terms "below" and "lower" indicate a direction in which the bracket 600 is arranged with respect to the display panel 300, such as, for example, a direction opposite to the Z-axis direction. In addition, "left side," "right side," "top side" and "bottom side" indicate directions when the display panel 300 is seen in a plan view. For example, "left side" may indicate a direction opposite to an X-axis direction, "right side" may indicate the X-axis direction, "top side" may indicate a Y-axis direction, and "bottom side" may indicate a direction opposite to the Y-axis direction.

The display device 10 may be rectangular in a plan view. For example, the display device 10 may have a rectangular planar shape having short sides in a first direction (e.g., in the X-axis direction) and long sides in a second direction (e.g., in the Y-axis direction), as illustrated in FIGS. 1 and 2. Each corner where a short side extending in the first direction (X-axis direction) meets a long side extending in the second direction (Y-axis direction) may be rounded with a predetermined (e.g., set) curvature or may be right-angled. However, the planar shape of the display device 10 is not limited to a rectangular shape, but may be any suitable shape, such as, for example, another polygonal shape, a circular shape, or an elliptical shape.

The display device 10 may include a flat first surface DR1 and a second surface DR2. The second surface DR2 may extend from right and left sides of the first surface DR1. The second surface DR2 may be flat or curved. When the second surface DR2 is flat, an angle between the first surface DR1 and the second surface DR2 may be an obtuse angle. When the second surface DR2 is curved, it may have a constant curvature or a varying curvature.

In some embodiments, as shown in FIG. 1, the second surface DR2 extends from each of the right and left sides of the first surface DR1. However, embodiments of the present disclosure are not limited thereto. For example, in some embodiments, the second surface DR2 may extend from only one of the right and left sides of the first surface DR1. In some embodiments, the second surface DR2 may extend from the right and left sides of the first surface DR1, and may also extend from at least any one selected from the top and bottom sides of the first surface DR1. Some embodiments where the second surface DR2 is at right and left edges of the display device 10 will be described below.

The cover window 100 may be on the display panel 300 to cover an upper surface of the display panel 300. Thus, the cover window 100 may function to protect the upper surface of the display panel 300.

The cover window 100 may include a light transmitting portion 100DA corresponding to the display panel 300 and a light shielding portion 100NDA corresponding to an area other than the display panel 300. The cover window 100 may be on the first surface DR1 and the second surfaces DR2. The light transmitting portion 100DA may be on at least a portion of the first surface DR1 and at least a portion of each of the second surfaces DR2. The light shielding portion 100NDA may be opaque. In some embodiments, the light shielding portion 100NDA may include a decorative layer having a pattern that may be shown (e.g., may be viewable) to a user when an image is not displayed. The light transmitting portion 100DA may include a first light transmitting portion 100A1 corresponding to a first area A1 of the display panel 300 to be described in more detail herein below and a second light transmitting portion 100A2 corresponding to a second area A2 of the display panel 300.

The display panel 300 may be under the cover window 100. The display panel 300 may overlap the light transmitting portion 100DA of the cover window 100. The display panel 300 may be on the first surface DR1 and the second surfaces DR2. Therefore, an image of the display panel 300 can be seen not only on (e.g., through) the first surface DR1 but also on (e.g., through) the second surfaces DR2.

The display panel 300 may include the first area A1 and the second area A2. The first area A1 may overlap the first light transmitting portion 100A1 of the cover window 100. The second area A2 may overlap the second light transmitting portion 100A2 of the cover window 100. The first area A1 may be on (e.g., at) a side of the second area A2, such as, for example, on a top side of the second area A2, as illustrated in FIG. 2.

The display panel 300 may be a light emitting display panel including light emitting elements. For example, the display panel 300 may be an organic light emitting display panel using organic light emitting diodes that include organic light emitting layers, a micro light emitting diode display panel using micro light emitting diodes, a quantum dot light emitting display panel including quantum dot light emitting diodes that include quantum dot light emitting layers, or an inorganic light emitting display panel using inorganic light emitting elements that include inorganic semiconductors. Some embodiments where the display panel 300 is an organic light emitting display panel will be mainly described below.

The display circuit board 310 and the display driver circuit 320 may be attached to a side of the display panel 300. An end of the display circuit board 310 may be attached onto pads provided on the side of the display panel 300 by using an anisotropic conductive film. The display circuit board 310 may be a flexible printed circuit board that can be bent, a rigid printed circuit board that is rigid and not easily bent, or a composite printed circuit board including both a rigid printed circuit board and a flexible printed circuit board.

The display driver circuit 320 receives control signals and power supply voltages through the display circuit board 310 and generates and outputs signals and voltages for driving the display panel 300. The display driver circuit 320 may include an integrated circuit. The display driver circuit 320 may be on the display panel 300. For example, the display driver circuit 320 may be attached onto the display panel 300 by using a chip-on-glass (COG) method, a chip-on-plastic (COP) method, and/or an ultrasonic method. In some embodiments, the display driver circuit 320 may be on the display circuit board 310.

The sensor driver 330 may be on the display circuit board 310. The sensor driver 330 may include an integrated circuit. The sensor driver 330 may be attached onto the display circuit board 310. The sensor driver 330 may be electrically connected to sensor electrodes of a sensor electrode layer of the display panel 300, through the display circuit board 310. The sensor driver 330 may transmit driving signals to driving electrodes among the sensor electrodes and detect a voltage charged in mutual capacitance between the driving electrodes and sensing electrodes among the sensor electrodes, through the sensing electrodes. Therefore, the sensor driver 330 can determine the occurrence of a user's touch and measure the skin moisture of the user (e.g., measure the amount of skin moisture of the user). As used herein, the term "skin moisture" may refer to an amount of water (e.g., sweat) on a user's skin. The user's touch includes a contact touch and a proximity touch. For example, as used herein, the term "user's touch" may refer to either a physical contact touch or a proximity touch of the user. The contact touch indicates that (e.g., occurs when) an object, such as a user's finger or a pen, directly (e.g., physically) contacts the cover window 100 of the display device 10 on the sensor electrode layer. The proximity touch indicates that (e.g., occurs when) an object, such as a user's finger or a pen, is positioned in proximity above (e.g., hovering above) a surface of the display device 10.

A side of a flexible film 390 may be attached onto the upper surface of the display panel 300 at a bottom side of the display panel 300 by using an anisotropic conductive film. The other side of the flexible film 390 may be attached onto an upper surface of the display circuit board 310 at a top side of the display circuit board 310 by using an anisotropic conductive film. The flexible film 390 may be a flexible film that can be bent.

In some embodiments, the flexible film 390 may be omitted, and the display circuit board 310 may be directly attached to the side of the display panel 300. In some embodiments, the side of the display panel 300 that the display circuit board 310 is attached to may be bent toward a lower surface of the display panel 300.

The bracket 600 may be under the display panel 300. The bracket 600 may include plastic, metal, or both plastic and metal. The bracket 600 may include a first camera hole CMH1 into which a camera device 720 is inserted (e.g., positioned), a battery hole BH in which the battery 790 is inserted (e.g., positioned), a cable hole CAH through which a cable 314 connected to the display circuit board 310 passes, and a sensor hole SH in which under-panel sensors 740, 750 and 760 are inserted (e.g., positioned). The sensor hole SH may overlap the first area A1 of the display panel 300.

The main circuit board 700 and the battery 790 may be under the bracket 600. The main circuit board 700 may be a printed circuit board or a flexible printed circuit board.

The main circuit board 700 may include a main processor 710, the camera device 720, a main connector 730, and the under-panel sensors 740, 750 and 760. The camera device 720 may be on (e.g., at) both upper and lower surfaces of the main circuit board 700, the main processor 710 may be on the upper surface of the main circuit board 700, and the main connector 730 may be on the lower surface of the main circuit board 700. The under-panel sensors 740, 750 and 760 may overlap the first area A1 of the display panel 300.

The main processor 710 may control all the functions of the display device 10. For example, the main processor 710 may output digital video data to the display driver circuit 320 through the display circuit board 310 so that the display panel 300 can display an image. In addition, the main processor 710 may receive touch data from the sensor driver 330, determine a user's touch coordinates (e.g., coordinates corresponding to the location of the user's touch on the display device 10), and then execute an application indicated by an icon displayed at the user's touch coordinates.

The main processor 710 may control the display device 10 according to sensor signals received from the under-panel sensors 740, 750 and 760. For example, the under-panel sensors 740, 750 and 760 may include a proximity sensor 740, an illuminance sensor 750, and an iris sensor 760. However, the under-panel sensors 740, 750 and 760 are not limited to those illustrated in FIG. 2. The main processor 710 may determine whether an object is located close to an upper surface of the display device 10 according to a proximity sensor signal received from the proximity sensor 740. When an object is located close to the upper surface of the display device 10 in (e.g., during) a call mode, in which a user talks to the other party using the display device 10, the main processor 710 may not execute an application indicated by an icon displayed at touch coordinates even if the user performs a touch action.

The main processor 710 may determine the brightness of the upper surface of the display device 10 according to an illuminance sensor signal received from the illuminance sensor 750. The main processor 710 may adjust the luminance (e.g., the brightness) of an image displayed on the display panel 300 according to the brightness of the upper surface of the display device 10. For example, the main processor 710 may adjust the luminance (e.g., brightness) of an image displayed on the display panel 300 according to the illuminance (e.g., intensity of light) incident upon the upper surface of the display device 10 from outside the display device 10.

The main processor 710 may determine whether an iris image of a user is identical to an iris image pre-stored in a memory according to an iris sensor signal received from the iris sensor 760. When the iris image of the user is identical to the iris image pre-stored in the memory, the main processor 710 may unlock the display device 10 and display a home screen on the display panel 300.

The camera device 720 processes an image frame, such as a still image or a moving image, obtained by an image sensor in (e.g., during) a camera mode and outputs the processed image frame to the main processor 710.

The cable 314 passing through the cable hole CAH of the bracket 600 may be connected to the main connector 730. Therefore, the main circuit board 700 may be electrically connected to the display circuit board 310.

The proximity sensor 740 is a sensor for detecting whether an object is located close to the upper surface of the display device 10. The proximity sensor 740 may include a light source which outputs light and a light reception unit which receives light reflected by an object. The proximity sensor 740 may determine whether there is an object located close to the upper surface of the display device 10 according to the amount of light reflected by the object. The proximity sensor 740 may generate a proximity sensor signal according to whether there is an object located close to the upper surface of the display device 10 and output the proximity sensor signal to the main processor 710.

The illuminance sensor 750 is a sensor for detecting the brightness of (e.g., brightness of light incident upon) the upper surface of the display device 10. The illuminance sensor 750 may include a resistor whose resistance value varies according to the brightness of incident light. The illuminance sensor 750 may determine the brightness of the upper surface of the display device 10 according to the resistance value of the resistor. The illuminance sensor 750 may generate an illuminance sensor signal according to the brightness of the upper surface of the display device 10 and output the illuminance sensor signal to the main processor 710.

The iris sensor 760 is a sensor for detecting whether a photographed image of a user's iris is identical to an iris image pre-stored in the memory. The iris sensor 760 may generate an iris sensor signal, according to whether the iris image of the user is identical to the iris image pre-stored in the memory, and output the iris sensor signal to the main processor 710. For example, the iris sensor 760 may generate an iris sensor signal according to the iris image of the user and output the iris sensor signal to the main processor 710, and the main processor 710 may determine whether the iris image of the user is identical to the iris image pre-stored in the memory.

The battery 790 may not overlap the main circuit board 700 in a third direction (e.g., in a Z-axis direction). The battery 790 may overlap the battery hole BH of the bracket 600.

The main circuit board 700 may be further equipped with a mobile communication module capable of transmitting and/or receiving wireless signals to or from at least one of a base station, an external terminal, and a server over a mobile communication network. The wireless signals may include voice signals, video call signals, and/or various forms of data according to transmission/reception of text/multimedia messages.

The bottom cover 900 may be under the main circuit board 700 and the battery 790. The bottom cover 900 may be fastened and fixed to the bracket 600. The bottom cover 900 may form (e.g., provide) the bottom exterior of the display device 10. The bottom cover 900 may include plastic, metal, or both plastic and metal.

A second camera hole CMH2 exposing a lower surface of the camera device 720 may be in the bottom cover 900. However, the position of the camera device 720 and the positions of the first camera hole CMH1 and the second camera hole CMH2 corresponding to the camera device 720 are not limited to the embodiments illustrated in FIG. 2.

Figure 3:
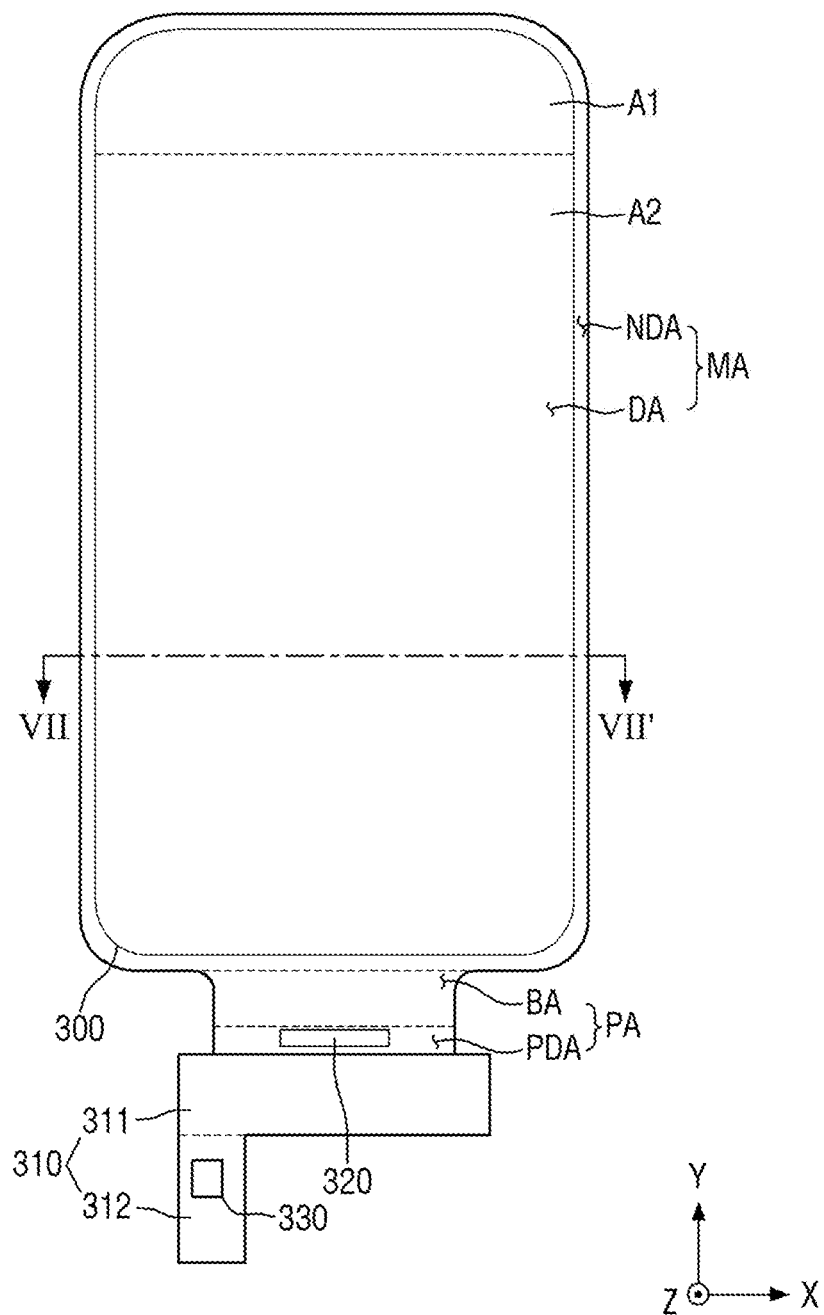
FIGS. 3 and 4 are plan views of display panels, according to some embodiments.
Figure 4:
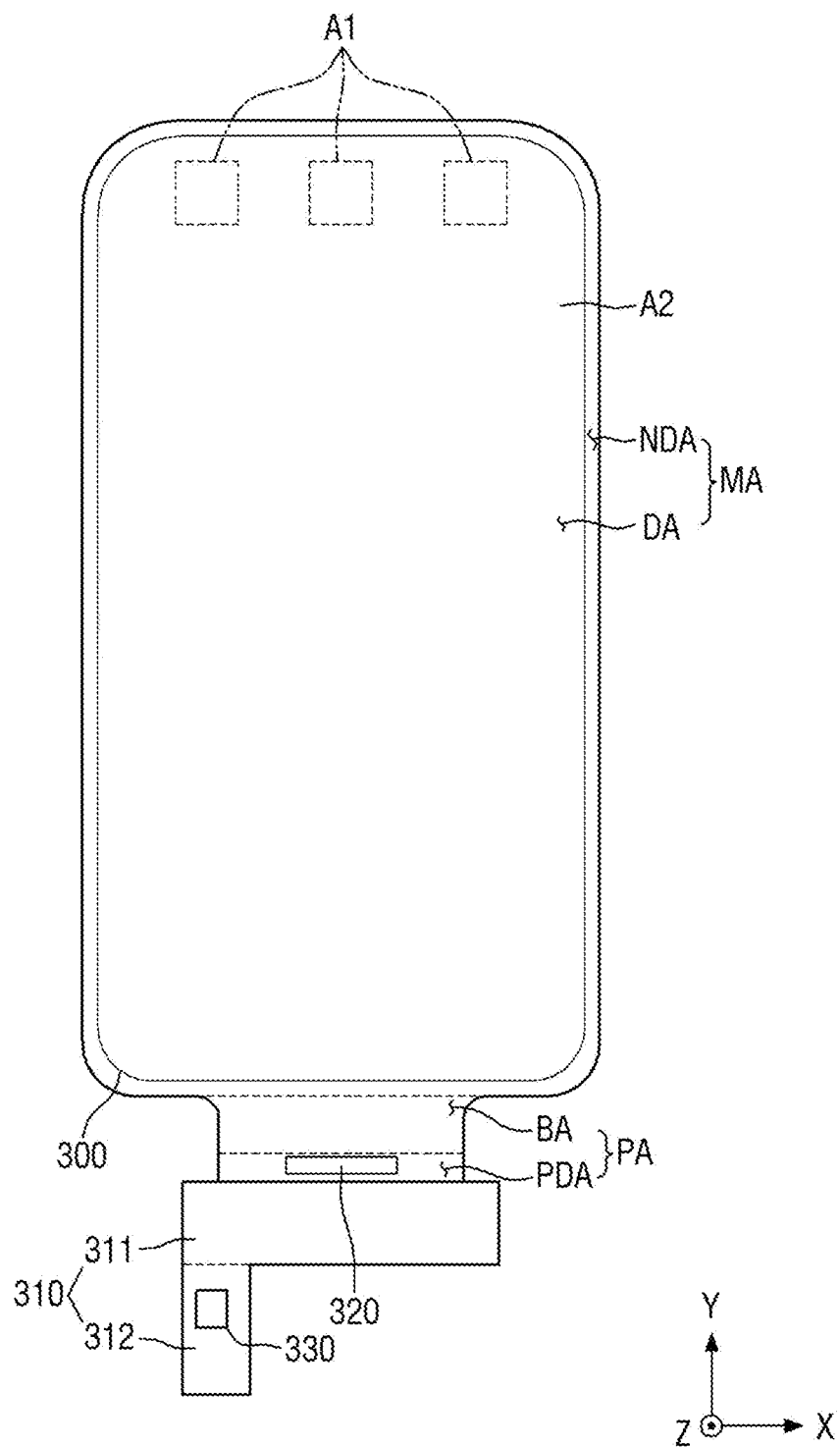
Figure 5:
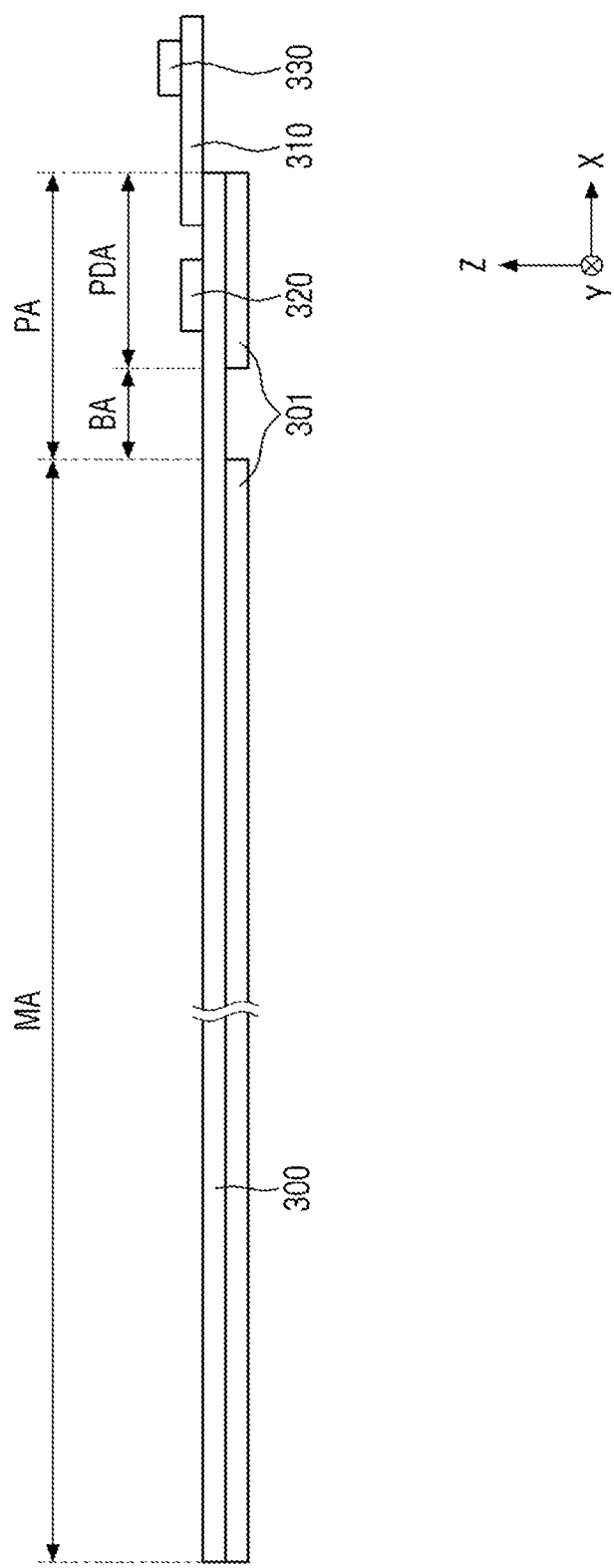
FIGS. 5 and 6 are side views of the display panel of FIG. 3, according to some embodiments.
Figure 6:
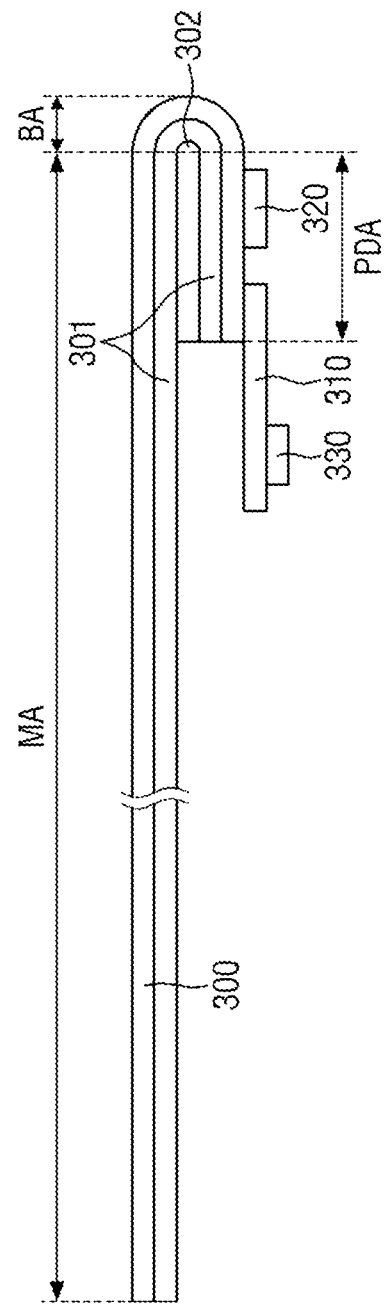

FIGS. 3 and 4 are plan views of display panels 300 according to some embodiments. FIGS. 5 and 6 are side views of the display panel 300 of FIG. 3.

Referring to FIGS. 3 through 6, a display panel 300 according to some embodiments may be any one selected from an organic light emitting display panel, a liquid crystal display panel, a plasma display panel, a field emission display panel, an electrophoretic display panel, an electrowetting display panel, a quantum dot light emitting display panel, an inorganic light emitting display panel, and a micro-light emitting diode display panel. Some embodiments where the display panel 300 is an organic light emitting display panel will be mainly described below, but embodiments are not limited thereto.

The display panel 300 may include a main area MA and a protruding area PA protruding from a side of the main area MA.

The main area MA may include a rectangular plane having short sides in the first direction (X-axis direction) and long sides in the second direction (Y-axis direction) crossing (e.g., intersecting) the first direction (X-axis direction). Each corner where a short side extending in the first direction (X-axis direction) meets a long side extending in the second direction (Y-axis direction) may be rounded with a predetermined (e.g., set) curvature or may be right-angled. However, the planar shape of the display device 10 is not limited to a quadrilateral shape, but may be any suitable shape, such as, for example, another polygonal shape, a circular shape, or an elliptical shape. The main area MA may be flat. However, embodiments are not limited thereto. For example, in some embodiments, the main area MA may include curved portions at its left and right ends. In some such embodiments, the curved portions may have a constant curvature or a varying curvature.

The main area MA may include a display area DA where pixels are arranged to display an image and a non-display area NDA around the display area DA.

In the display area DA, the pixels, scan lines, data lines and power lines connected to the pixels may be arranged. In some embodiments where the main area MA includes the curved portions, the display area DA may be in the curved portions. In some embodiments, an image of the display panel 300 may also be seen in (e.g., through) the curved portions.

The display area DA may include the first area A1 and the second area A2 described above. The first area A1 may be on (e.g., adjacent to) a side of the second area A2. However, embodiments are not limited thereto. In some embodiments, as illustrated in FIG. 4, the display area DA may also include a plurality of first areas A1, and the first areas A1 may be surrounded by the second area A2. In addition, at least some of the first areas A1 may be adjacent to corners of the second area A2.

The area of the first area A1 may be different from that of the second area A2. For example, the area of the first area A1 may be smaller than that of the second area A2.

Referring again to FIG. 3, the non-display area NDA may be defined as an area excluding the first area A1 and the second area A2 from the display panel 300. A scan driver 340 for transmitting scan signals to the scan lines and link lines connecting the data lines and the display driver circuit 320 may be in the non-display area NDA.

The protruding area PA may protrude from a side of the main area MA. For example, the protruding area PA may protrude from a bottom side of the main area MA as illustrated in FIG. 3. A length of the protruding area PA in the first direction (X-axis direction) may be smaller than a length of the main area MA in the first direction (X-axis direction).

The protruding area PA may include a bending area BA and a pad area PDA. In some embodiments, the pad area PDA may be on a side of the bending area BA, and the main area MA may be on the other side of the bending area BA. For example, the pad area PDA may be on a bottom side of the bending area BA, and the main area MA may be on a top side of the bending area BA.

The display panel 300 may be flexible so that it can be curved, bent, folded, and/or rolled. Therefore, the display panel 300 can be bent in the bending area BA in a thickness direction (Z-axis direction). A surface of the pad area PDA of the display panel 300 faces upward before the display panel 300 is bent, as illustrated in FIG. 5. After the display panel 300 is bent, as illustrated in FIG. 6, the surface of the pad area PDA of the display panel 300 faces downward. Accordingly, the pad area PDA may be under the main area MA and may overlap the main area MA.

Pads electrically connected to the display driver circuit 320 and the display circuit board 310 may be on the pad area PDA of the display panel 300.

An under-panel cover 301 may be under the display panel 300. The under-panel cover 301 may be attached to the lower surface of the display panel 300 by an adhesive member. The adhesive member may be, for example, a pressure sensitive adhesive (PSA).

The under-panel cover 301 may include a light absorbing member for absorbing light incident from the outside, a buffer member for absorbing external shock, and a heat dissipating member for efficiently dissipating the heat of the display panel 300.

The light absorbing member may be under the display panel 300. The light absorbing member blocks or reduces transmission of light to prevent elements under the light absorbing member, such as, for example, the display circuit board 310, etc. from being seen from above the display panel 300 (or reduces the visibility of the elements). The light absorbing member may include a light absorbing material such as a black pigment and/or dye.

The buffer member may be under the light absorbing member. The buffer member absorbs external shock to prevent or reduce damage to the display panel 300. The buffer member may include a single layer or a plurality of layers. For example, the buffer member may include polymer resin such as polyurethane, polycarbonate, polypropylene and/or polyethylene and/or may include an elastic material such as sponge including foamed rubber, a urethane-based material and/or an acrylic-based material. The buffer member may be a cushion layer.

The heat dissipating member may be under the buffer member. The heat dissipating member may include a first heat dissipating layer containing graphite and/or carbon nanotubes and a second heat dissipating layer including a metal thin film (such as copper, nickel, ferrite and/or silver) capable of shielding electromagnetic waves and having excellent thermal conductivity.

To easily bend the display panel 300, the under-panel cover 301 may not be on the bending area BA of the display panel 300, as illustrated in FIG. 5. Because the pad area PDA is under the main area MA after the display panel 300 is bent in the bending area BA, it may overlap the main area MA. Therefore, the under-panel cover 301 on the main area MA of the display panel 300 and the under-panel cover 301 on the pad area PDA of the display panel 300 may be attached by an adhesive member 302. The adhesive member 302 may be a PSA.

The display driver circuit 320 outputs signals and voltages for driving the display panel 300. For example, the display driver circuit 320 may supply data voltages to the data lines. In addition, the display driver circuit 320 may supply power supply voltages to the power lines and supply scan control signals to the scan driver 340. The display driver circuit 320 may include an integrated circuit and may be mounted on the pad area PDA of the display panel 300 using a COG method, a COP method, and/or an ultrasonic bonding method. However, embodiments are not limited thereto. For example, the display driver circuit 320 may be mounted on the display circuit board 310.

The pads may include display pads electrically connected to the display driver circuit 320 and sensor pads electrically connected to sensor wirings.

The display circuit board 310 may be attached onto the pads using an anisotropic conductive film. Therefore, lead lines of the display circuit board 310 may be electrically connected to the pads. The display circuit board 310 may be a flexible printed circuit board, a printed circuit board, or a flexible film such as a chip-on-film.

The sensor driver 330 may be connected to sensor electrodes of a sensor electrode layer SEL of the display panel 300. The sensor driver 330 transmits driving signals to the sensor electrodes of the sensor electrode layer SEL and measures mutual capacitance values of the sensor electrodes. Each driving signal may be a signal having a plurality of driving pulses. The sensor driver 330 may determine the occurrence of a user's touch and proximity based on the mutual capacitance values. The user's contact touch indicates that an object, such as a user's finger or a pen, directly contacts a surface of the display device 10 on the sensor electrode layer SEL. The user's proximity indicates that an object, such as a user's finger or a pen, is in proximity with (e.g., hovers above) the surface of the display device 10.

The sensor driver 330 may be on the display circuit board 310. The sensor driver 330 may include an integrated circuit and may be mounted on the display circuit board 310.

Figure 7:
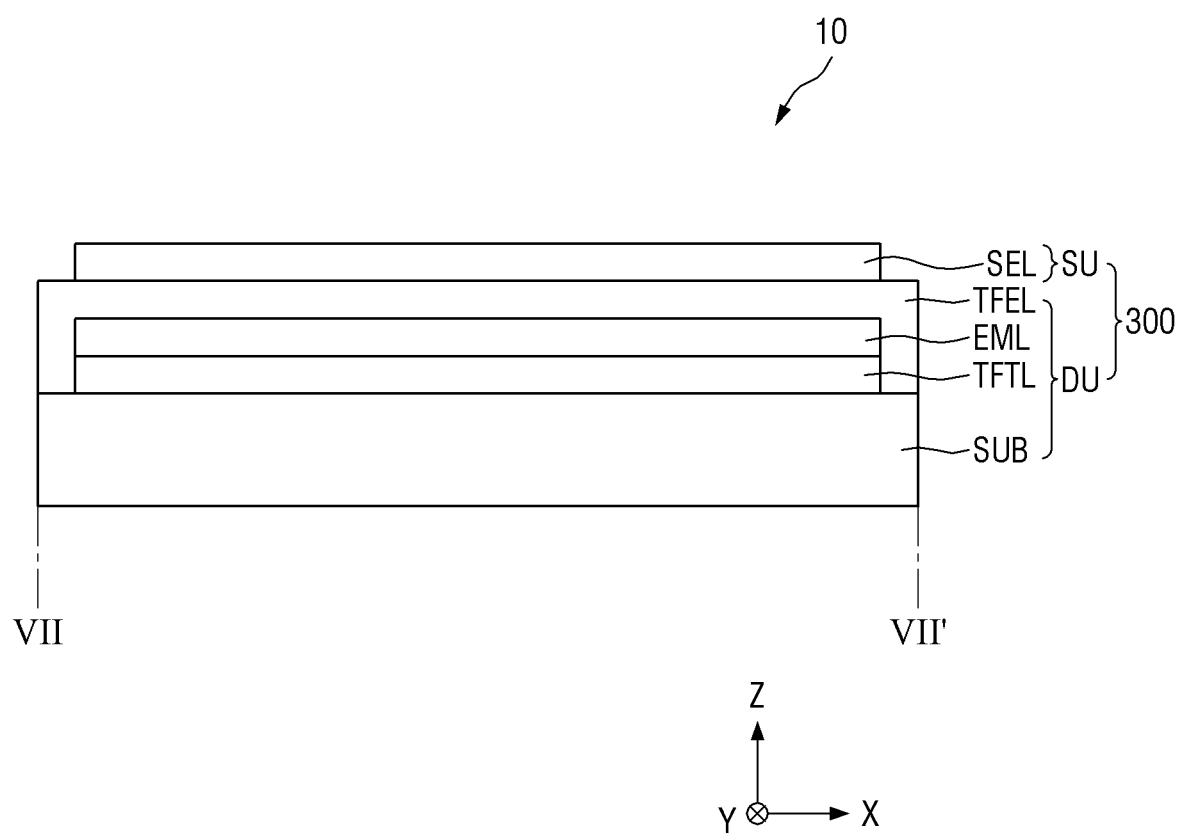
FIG. 7 is a cross-sectional view taken along line VII-VII' of FIG. 3, according to some embodiments.

FIG. 7 is a cross-sectional view taken along line VII-VII' of FIG. 3.

Referring to FIG. 7, the display panel 300 may include a display unit DU including a substrate SUB, a thin-film transistor layer TFTL on the substrate SUB, a light emitting element layer EML and a thin-film encapsulation layer TFEL. The display panel 300 may further include a sensor unit SU including the sensor electrode layer SEL.

The substrate SUB may include an insulating material such as glass, quartz, and/or polymer resin. The polymer material may be, for example, polyethersulfone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or any combination of the same. In some embodiments, the substrate SUB may include a metal material.

The substrate SUB may be a rigid substrate or a flexible substrate that can be bent, folded, and/or rolled. When the substrate SUB is a flexible substrate, it may include polyimide (PI), but embodiments are not limited thereto.

Figure 8:
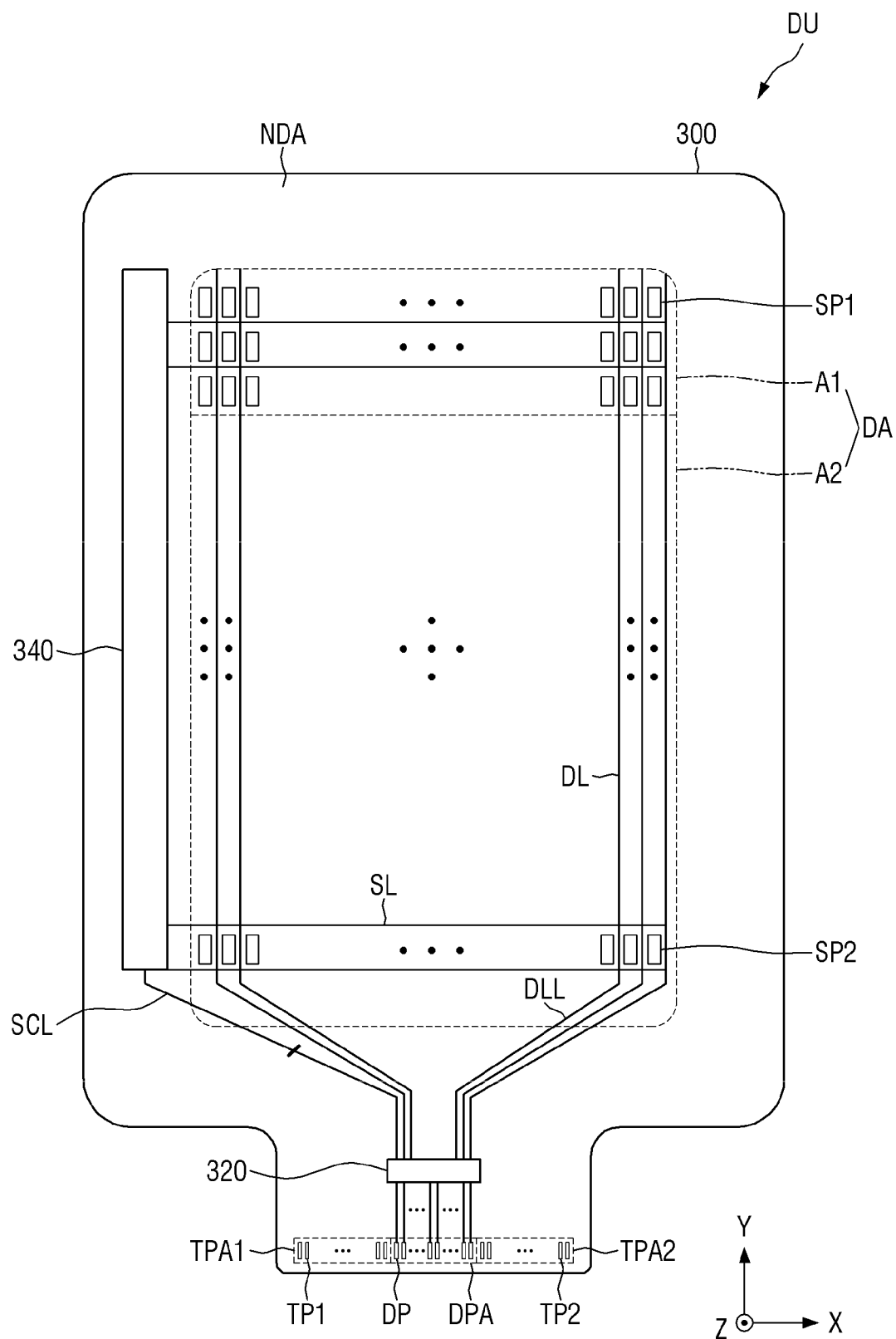
FIG. 8 is a plan view of a display unit of FIG. 7, according to some embodiments.

The thin-film transistor layer TFTL may be on the substrate SUB. The thin-film transistor layer TFTL may include respective thin-film transistors of pixels, scan lines, data lines, power lines, scan control lines, and routing lines connecting pads and the data lines. Each of the thin-film transistors may include a gate electrode, a semiconductor layer, a source electrode, and a drain electrode. When the scan driver 340 is in the non-display area NDA of the display panel 300, as illustrated in FIG. 8, it may include thin-film transistors.

The thin-film transistor layer TFTL may be in the display area DA and the non-display area NDA. For example, in some embodiments, the respective thin-film transistors of the pixels, the scan lines, the data lines, and the power lines of the thin-film transistor layer TFTL may be in the display area DA. The scan control lines and the link lines of the thin-film transistor layer TFTL may be in the non-display area NDA.

The light emitting element layer EML may be on the thin-film transistor layer TFTL. The light emitting element layer EML may include the pixels, each pixel including a first electrode, a light emitting layer and a second electrode. The light emitting element layer EML may further include a pixel defining layer defining the pixels. The light emitting layer may be an organic light emitting layer including an organic material. In some embodiments, the light emitting layer may include a hole transporting layer, an organic light emitting layer, and an electron transporting layer. When a predetermined (e.g., set) voltage is applied to the first electrode and a cathode voltage is applied to the second electrode through each thin-film transistor of the thin-film transistor layer TFTL, holes and electrons move to the organic light emitting layer respectively through the hole transporting layer and the electron transporting layer. The holes and electrons combine together in the organic light emitting layer, thereby emitting light. The pixels of the light emitting element layer EML may be in the display area DA.

The thin-film encapsulation layer TFEL may be on the light emitting element layer EML. The thin-film encapsulation layer TFEL prevents or reduces the penetration of oxygen and/or moisture into the light emitting element layer EML. Therefore, in some embodiments, the thin-film encapsulation layer TFEL may include at least one inorganic layer. The inorganic layer may be, but is not limited to, a silicon nitride layer, a silicon oxynitride layer, a silicon oxide layer, a titanium oxide layer, and/or an aluminum oxide layer. In addition, the thin-film encapsulation layer TFEL protects the light emitting element layer EML from foreign substances such as, for example, dust. Therefore, in some embodiments, the thin-film encapsulation layer TFEL may include at least one organic layer. The organic layer may include, but is not limited to, acryl resin, epoxy resin, phenolic resin, polyamide resin, and/or polyimide resin.

The thin-film encapsulation layer TFEL may be in both the display area DA and the non-display area NDA. For example, in some embodiments, the thin-film encapsulation layer TFEL may cover the light emitting element layer EML of the display area DA and of the non-display area NDA, and cover the thin-film transistor layer TFTL of the non-display area NDA.

The sensor electrode layer SEL may be on the thin-film encapsulation layer TFEL. In some embodiments, because the sensor electrode layer SEL is directly on the thin-film encapsulation layer TFEL, a thickness of the display device 10 can be reduced compared to when a separate touch panel is attached onto the thin-film encapsulation layer TFEL.

Figure 11:
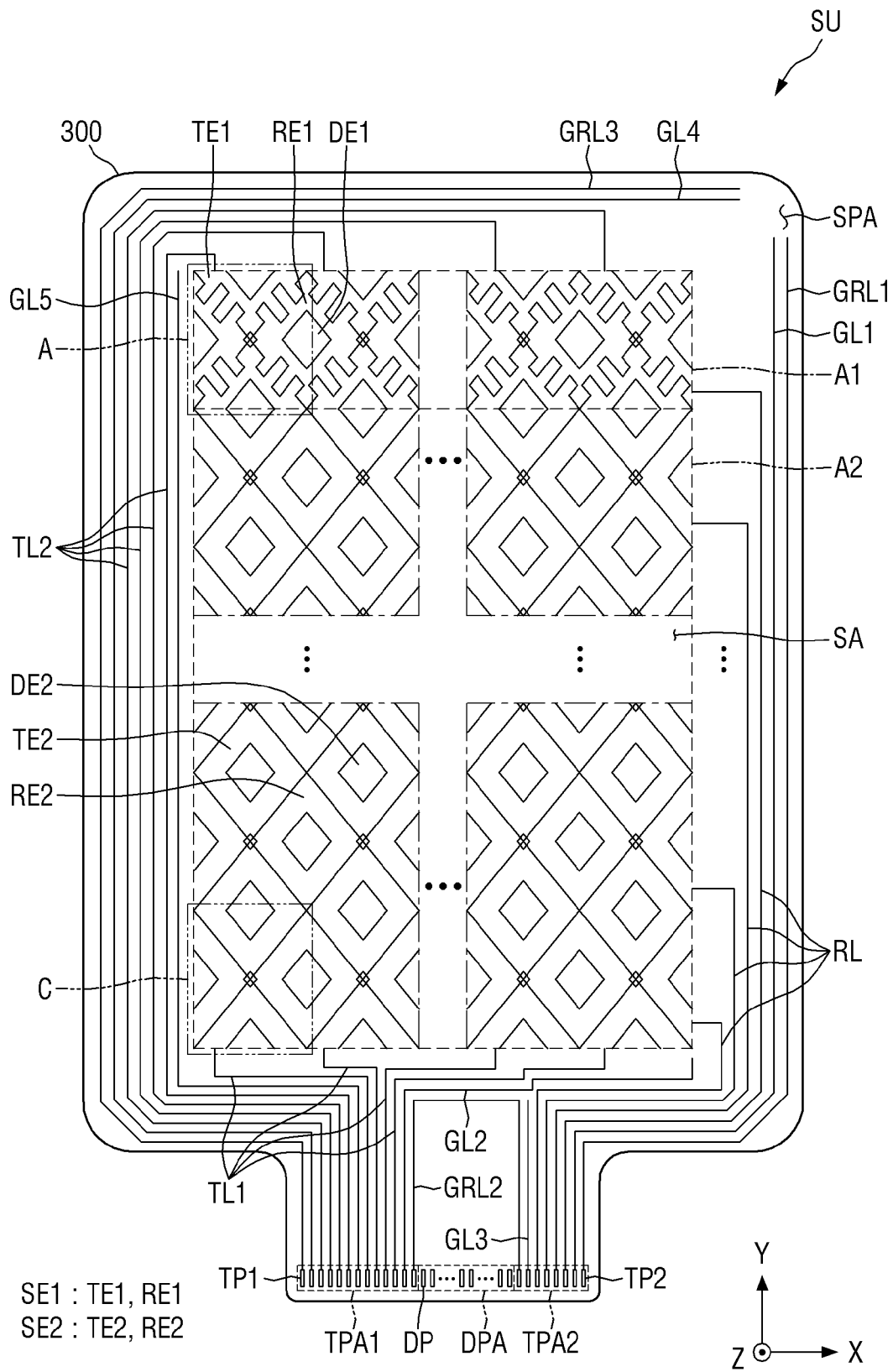
FIG. 11 is a plan view of a sensor unit of FIG. 7, according to some embodiments.

The sensor electrode layer SEL may include sensor electrodes driven in a capacitive manner and sensor wirings connecting sensor pads and the sensor electrodes. The sensor electrodes of the sensor electrode layer SEL may be in a sensor area SA overlapping the display area DA, as illustrated in FIG. 11. The sensor wirings of the sensor electrode layer SEL may be in a sensor peripheral area SPA overlapping the non-display area NDA, as illustrated in FIG. 11.

Figure 9:
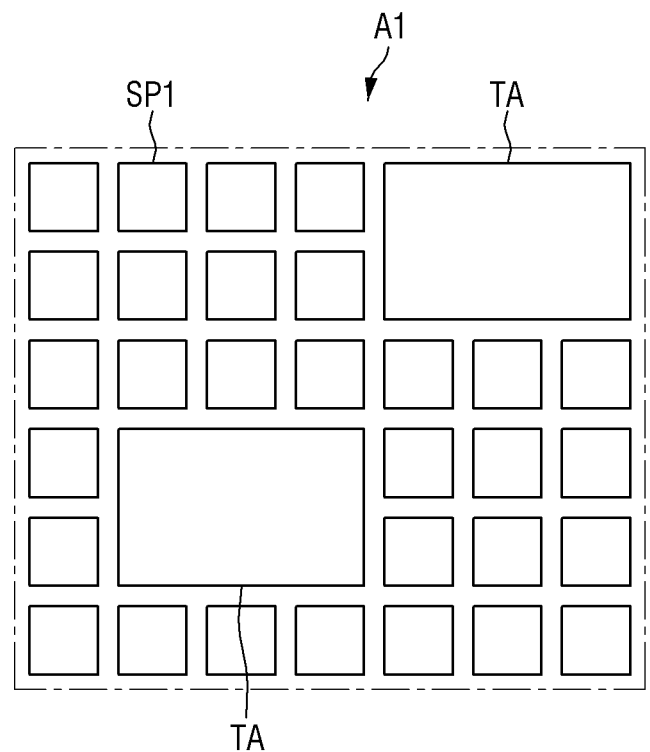
FIG. 9 is a plan view of a first area of FIG. 8, according to some embodiments.
Figure 10:
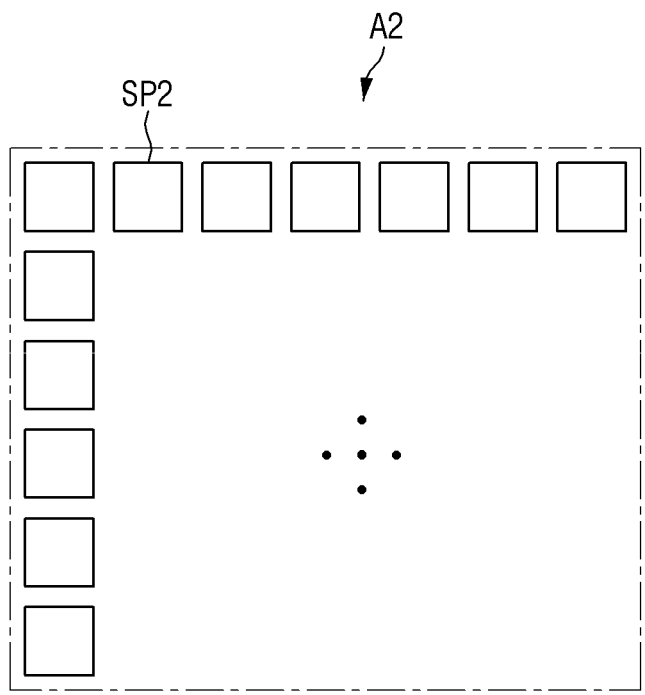
FIG. 10 is a plan view of a second area of FIG. 8, according to some embodiments.

FIG. 8 is a plan view of the display unit DU of FIG. 7. FIG. 9 is a plan view of the first area A1 of FIG. 8. FIG. 10 is a plan view of the second area A2 of FIG. 8.

In FIG. 8, only pixels SP1 and SP2, scan lines SL, data lines DL, scan control lines SCL, fan-out lines DLL, the scan driver 340, the display driver circuit 320, and display pads DP of the display unit DU are illustrated for ease of description.

Referring to FIG. 8, the pixels SP1 and SP2, the scan lines SL, and the data lines DL are in the display area DA.

The pixels SP1 and SP2 may include first pixels SP1 in the first area A1 and second pixels SP2 in the second area A2. These pixels will be described in more detail with reference to FIGS. 9 and 10.

Referring to FIGS. 9 and 10, the first area A1 may include the first pixels SP1 and transmitting areas TA surrounded by the first pixels SP1. The transmitting areas TA may overlap the above-described under-panel sensors 740, 750 and 760 in the thickness direction. In some embodiments, the transmitting areas TA may provide paths through which light from above the display panel 300 can enter the under-panel sensors 740, 750 and 760. Therefore, even if the under-panel sensors 740, 750 and 760 overlap the display panel 300, a reduction in the sensing capability of the under-panel sensors 740, 750 and 760 can be prevented or reduced.

The transmitting areas TA may not be in the second area A2. Due to the transmitting areas TA, the number of the first pixels SP1 per unit area of the first area A1 and the number of the second pixels SP2 per unit area of the second area A2 may be different. For example, the number of the first pixels SP1 per unit area of the first area A1 may be smaller than the number of the second pixels SP2 per unit area of the second area A2. Generally, when pixel density is different in the first area A1 and the second area A2, a boundary between the first area A1 and the second area A2 may be visible. Therefore, in the display device 10, according to some embodiments, first sensor electrodes SE1 in the first area A1 may be patterned differently than the second sensor electrodes SE2 in the second area A2, in order to minimize or reduce a phenomenon in which the boundary between the first area A1 and the second area A2 is visible. This will be described in more detail herein below with reference to FIG. 11.

Although the first pixels SP1 and the second pixels SP2 are square in a plan view in FIGS. 9 and 10, embodiments are not limited thereto. For example, in some embodiments, each of the first and second pixels SP1 and SP2 may have any suitable shape, such as a rectangle having short sides in the first direction (X-axis direction) and long sides in the second direction (Y-axis direction).

In addition, although the transmitting areas TA are rectangular in a plan view in FIG. 9, embodiments are not limited thereto. For example, in some embodiments, the transmitting areas TA may have any suitable shape, such as a quadrilateral shape other than the rectangular shape, a polygonal shape other than the quadrilateral shape, a circular shape, an elliptical shape, or an amorphous shape.

Referring again to FIG. 8, the scan lines SL may extend parallel (e.g., substantially parallel) to each other along the first direction (X-axis direction), and the data lines DL may extend parallel (e.g., substantially parallel) to each other along the second direction (Y-axis direction) crossing (e.g., intersecting) the first direction (X-axis direction).

Each of the pixels SP1 and SP2 may be connected to at least any one of the scan lines SL and any one of the data lines DL. Each of the pixels SP1 and SP2 may include thin-film transistors including a driving transistor and at least one switching transistor, a light emitting element, and a capacitor. Each of the pixels SP1 and SP2 may receive a data voltage of (e.g., from) a data line DL in response to a scan signal transmitted from a scan line SL, and supply a driving current to the light emitting element according to the data voltage applied to a gate electrode, thereby emitting light. The light emitting element is mainly described as an organic light emitting element including a first electrode, an organic light emitting layer and a second electrode, but embodiments are not limited thereto. In some embodiments, the light emitting element may also be implemented as a quantum dot light emitting element including a first electrode, a quantum dot light emitting layer and a second electrode. In some embodiments, the light emitting element may be an inorganic light emitting element including a first electrode, an inorganic light emitting layer having an inorganic semiconductor and a second electrode. In some embodiments, the light emitting element may be a micro light emitting element including a micro light emitting diode.

The scan driver 340 is connected to the display driver circuit 320 by the scan control lines SCL. Therefore, the scan driver 340 may receive a scan control signal of (e.g., from) the display driver circuit 320. The scan driver 340 generates scan signals according to the scan control signal and supplies the scan signals to the scan lines SL.

Although the scan driver 340 is shown to be at the left side of the non-display area NDA in FIG. 8, embodiments are not limited thereto. For example, in some embodiments, the scan driver 340 may be at the left side and the right side of the non-display area NDA.

The display driver circuit 320 may be connected to the display pads DP to receive digital video data and timing signals. The display driver circuit 320 converts the digital video data into analog positive/negative data voltages and supplies the data voltages to the data lines DL through the fan-out lines DLL. In addition, the display driver circuit 320 generates a scan control signal for controlling the scan driver 340 and supplies the generated scan control signal to the scan driver 340 through the scan control lines SCL. Pixels SP1 and SP2 to be supplied with the data voltages are selected by the scan signals of the scan driver 340, and the data voltages are supplied to the selected pixels SP1 and SP2.

Figure 12:
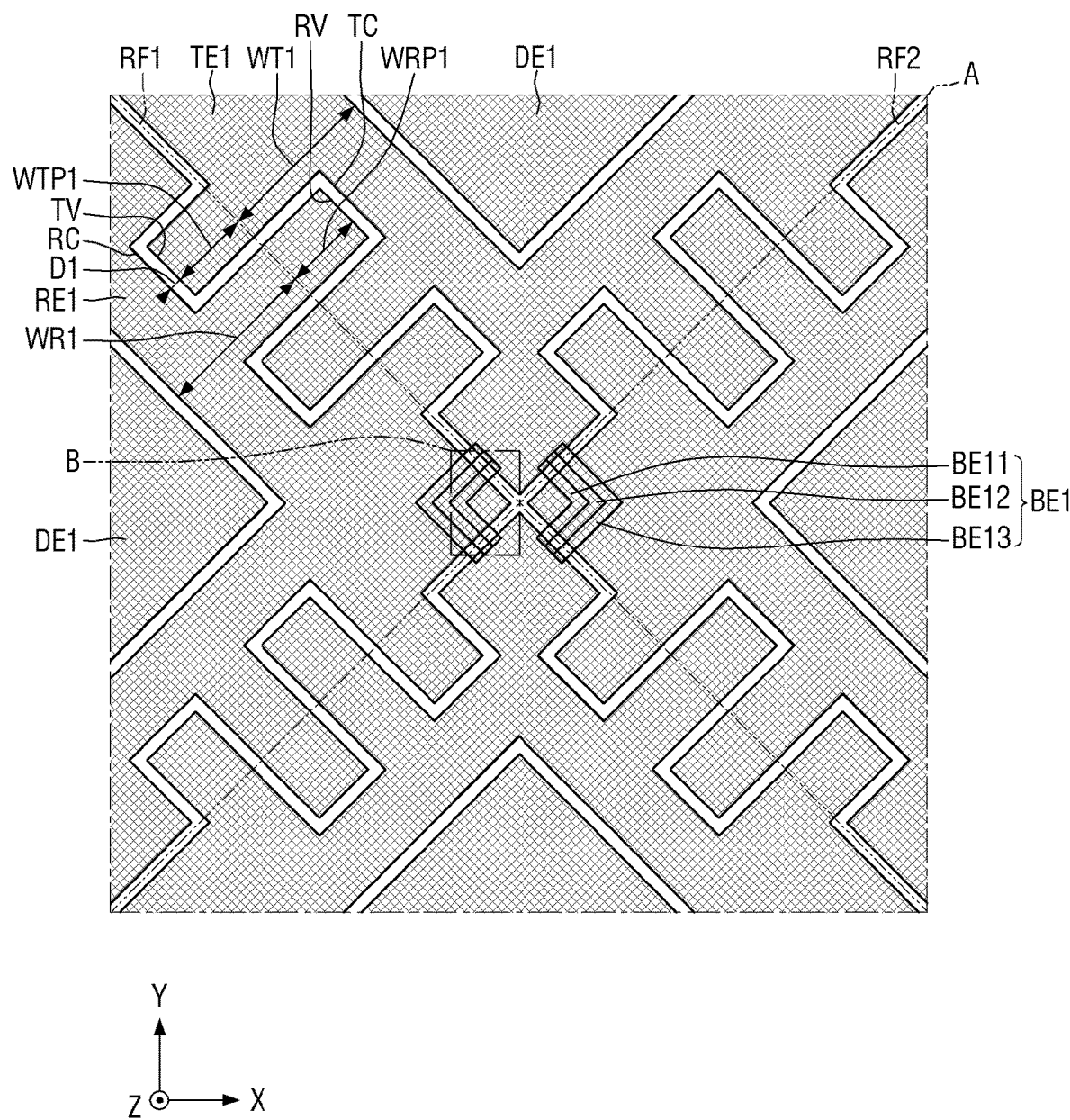
FIG. 12 is an enlarged view of area A of FIG. 11, according to some embodiments.
Figure 13:
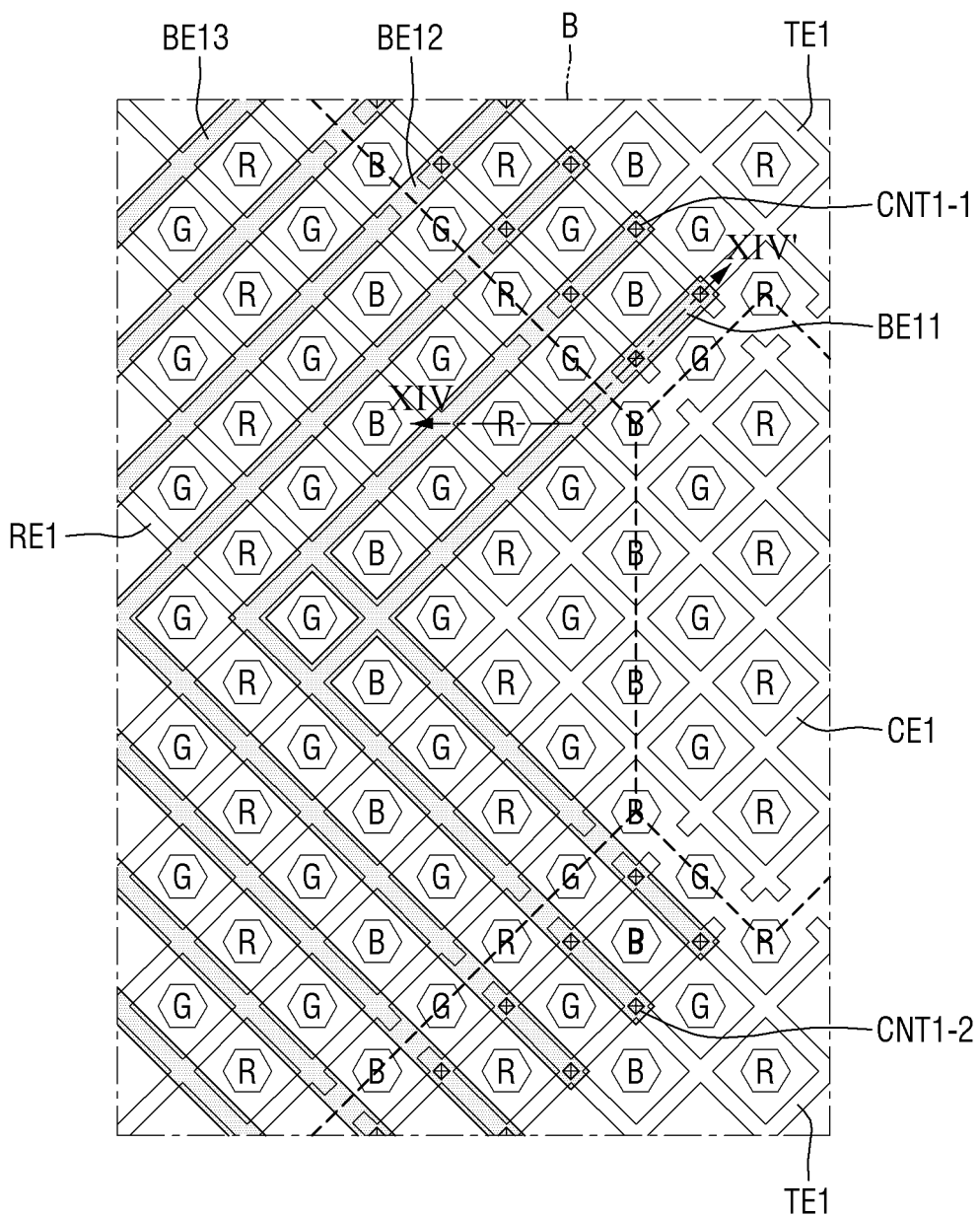
FIG. 13 is an enlarged view of area B of FIG. 12, according to some embodiments.
Figure 14:
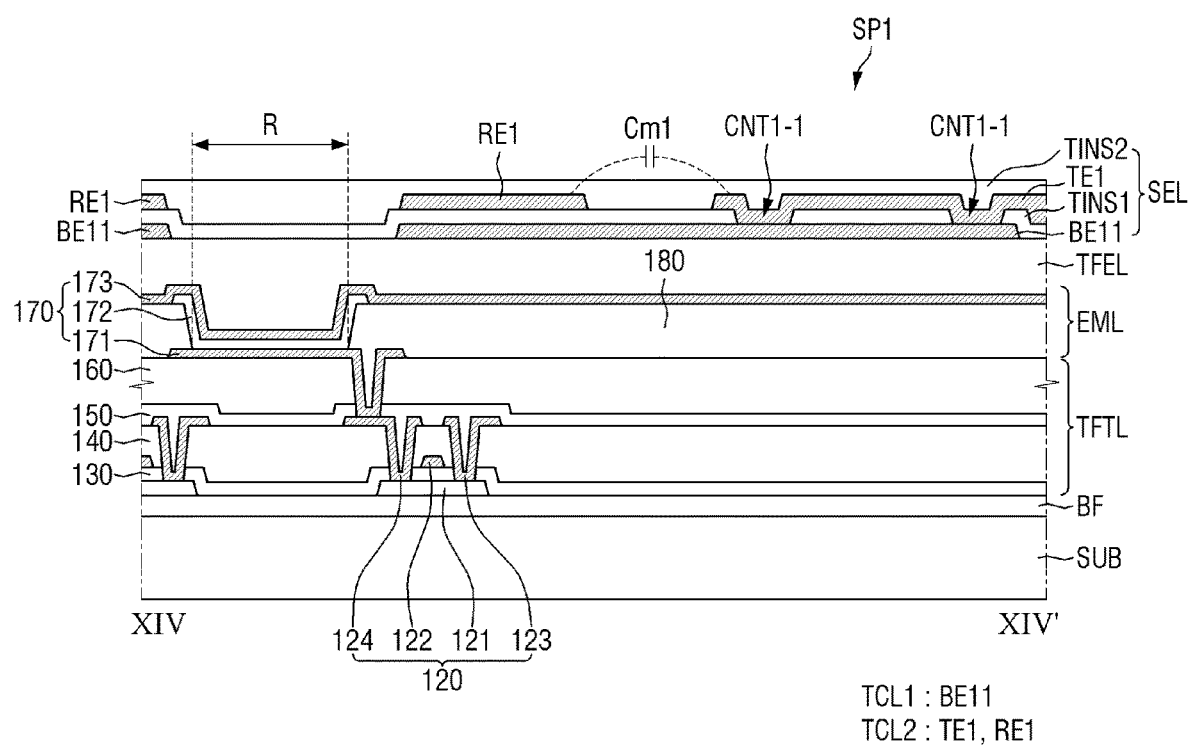
FIG. 14 is a cross-sectional view taken along line XIV-XIV' of FIG. 13, according to some embodiments.
Figure 15:
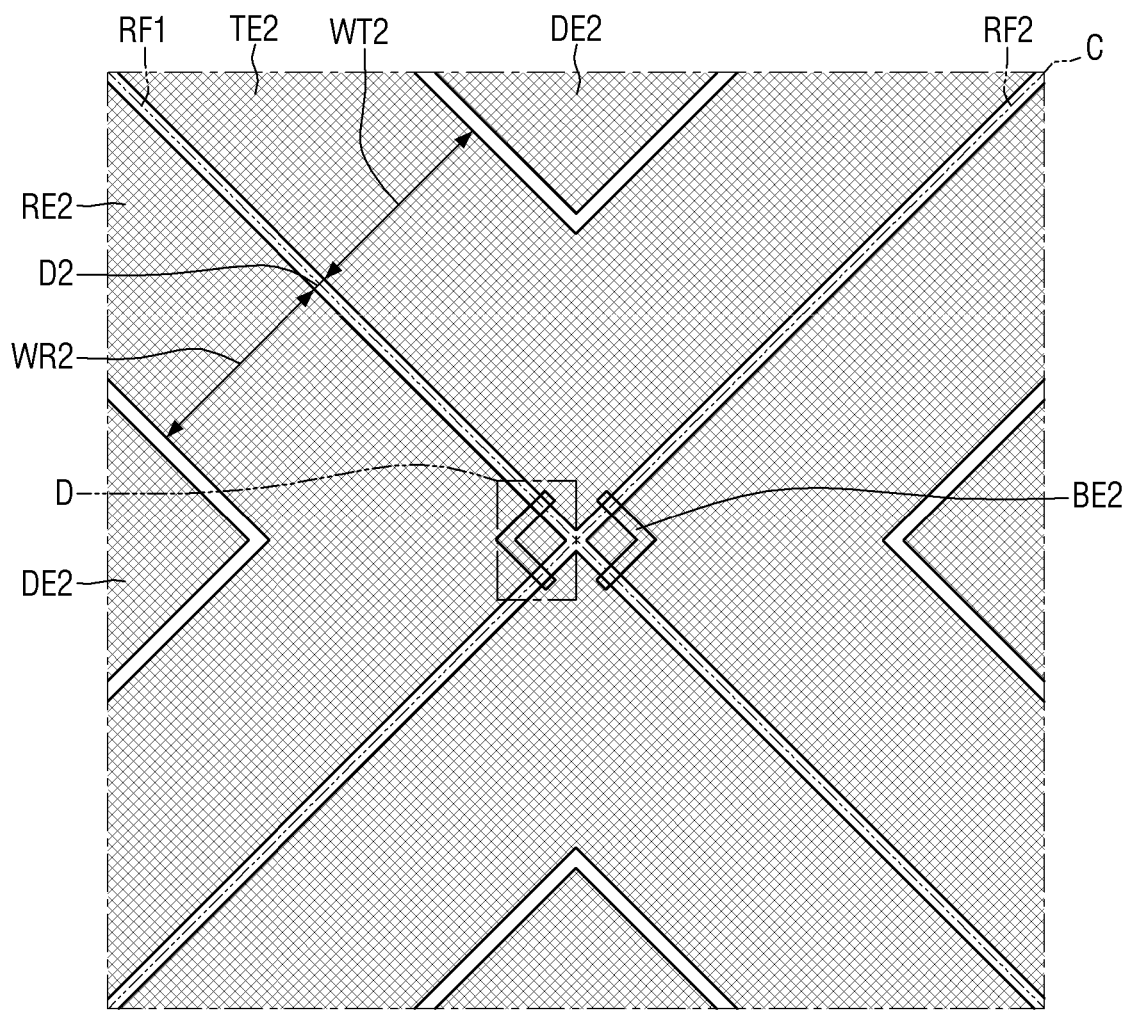
FIG. 15 is an enlarged view of area C of FIG. 11, according to some embodiments.
Figure 16:
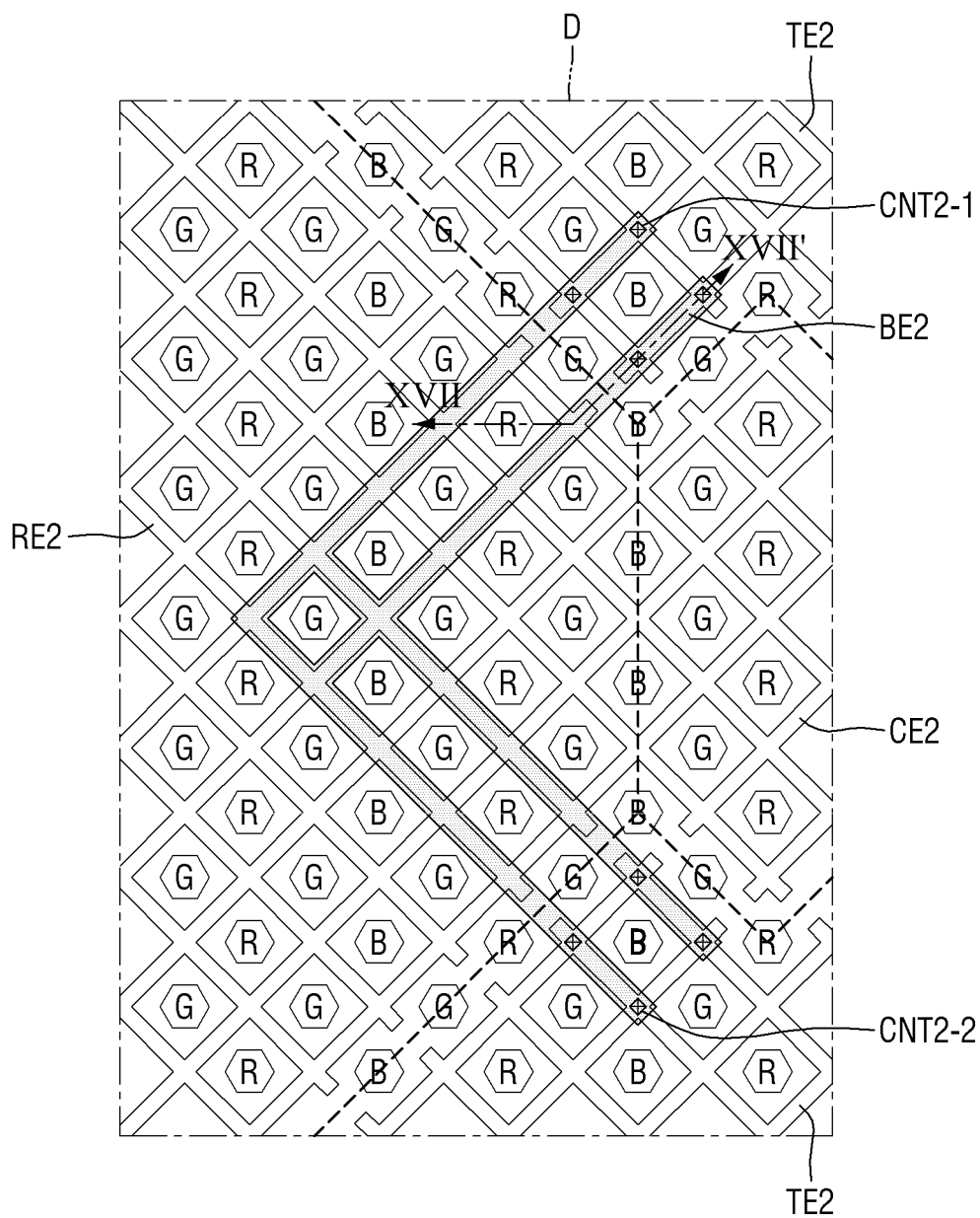
FIG. 16 is an enlarged view of area D of FIG. 15, according to some embodiments.
Figure 17:
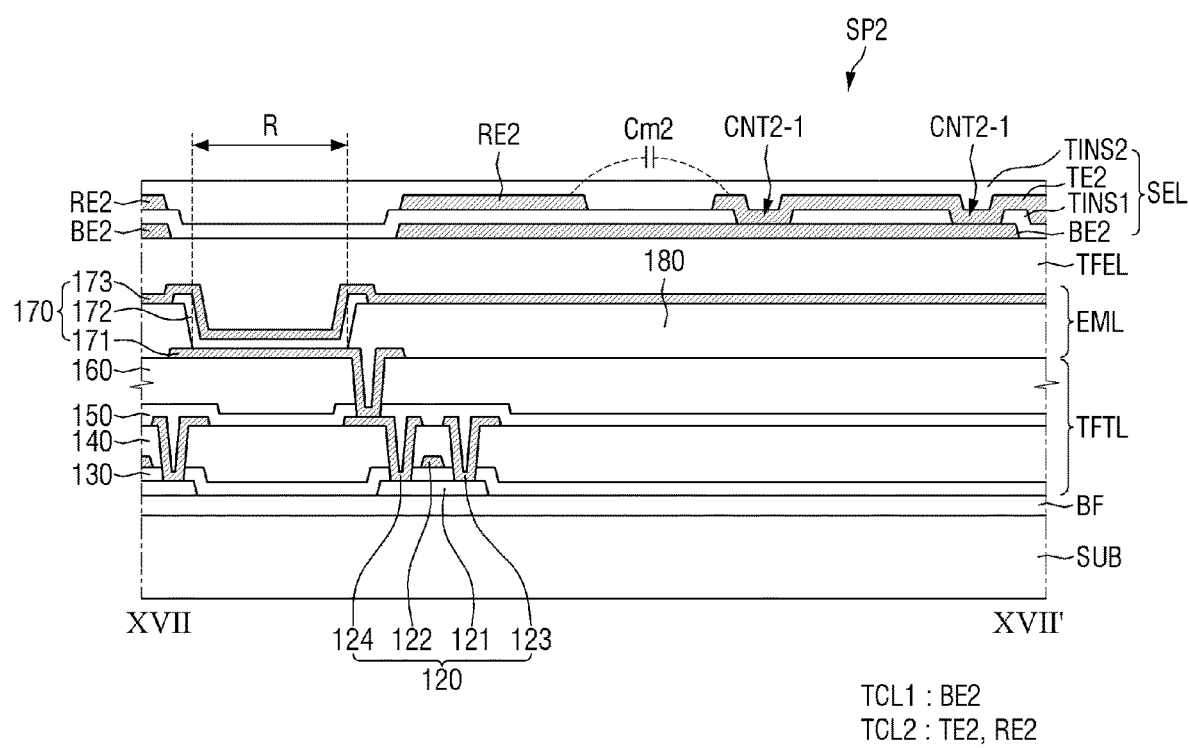
FIG. 17 is a cross-sectional view taken along line XVII-XVII' of FIG. 16, according to some embodiments.

FIG. 11 is a plan view of the sensor unit SU of FIG. 7. FIG. 12 is an enlarged view of area A of FIG. 11. FIG. 13 is an enlarged view of area B of FIG. 12. FIG. 14 is a cross-sectional view taken along line XIV-XIV' of FIG. 13. FIG. 15 is an enlarged view of area C of FIG. 11. FIG. 16 is an enlarged view of area D of FIG. 15. FIG. 17 is a cross-sectional view taken along line XVII-XVII' of FIG. 16.

In FIG. 11, sensor electrodes SE1 and SE2 of the sensor unit SU include two types of electrodes, such as, for example, driving electrodes TE1 and TE2 and sensing electrodes RE1 and RE2 connected by connection electrodes BE1 and BE2. The sensor unit SU is driven in a two-layer mutual capacitive manner in which driving signals are transmitted to the driving electrodes TE1 and TE2, and then changes in mutual capacitance are detected through the sensing electrodes RE1 and RE2. However, embodiments are not limited thereto. For example, in some embodiments, the sensor electrodes SE1 and SE2 of the sensor unit SU may include the driving electrodes TE1 and TE2 and the sensing electrodes RE1 and RE2 without the connection electrodes BE1 and BE2, and the sensor unit SU may be driven in a one-layer mutual capacitive manner. In some embodiments, the sensor unit SU may be driven in a one-layer self-capacitive manner in which changes in self-capacitance are detected using one type of electrode.

In FIG. 11, only the sensor electrodes SE1 and SE2, conductive patterns DE1 and DE2, sensor wirings TL1, TL2 and RL, sensor pads TP1 and TP2, guard lines GL1 through GL5, and ground lines CRL1 through CRL3 are illustrated for ease of description.

Referring to FIG. 11, the sensor unit SU includes the sensor area SA for sensing a user's touch and the sensor peripheral area SPA around the sensor area SA. The sensor area SA may overlap the display area DA of the display unit DU, and the sensor peripheral area SPA may overlap the non-display area NDA of the display unit DU.

The sensor area SA may include the first area A1 and the second area A2 described above. First sensor electrodes SE1 and first conductive patterns DE1 may be in the first area A1 of the sensor area SA, and second sensor electrodes SE2 and second conductive patterns DE2 may be in the second area A2.

The first sensor electrodes SE1 and the second sensor electrodes SE2 may include driving electrodes and sensing electrodes.

In some embodiments, the first sensor electrodes SE1 may include first driving electrodes TE1 and first sensing electrodes RE1.

The first sensing electrodes RE1 may be arranged in the first direction (X-axis direction) (e.g., arranged in lines in the first direction) and electrically connected to each other. The first driving electrodes TE1 may be arranged in the second direction (Y-axis direction) (e.g., arranged in lines in the second direction) crossing (e.g., intersecting) the first direction (X-axis direction) and may be electrically connected to each other. The first driving electrodes TE1 and the first sensing electrodes RE1 may be electrically isolated from each other. The first driving electrodes TE1 and the first sensing electrodes RE1 may be spaced apart from each other. The first driving electrodes TE1 may be parallel (e.g., substantially parallel) to each other in the second direction (Y-axis direction). For example, the first driving electrodes TE1 may be arranged in lines in the second direction (Y-axis direction), and the lines of first driving electrodes TE1 may be parallel (e.g., substantially parallel) to each other.

Referring to FIGS. 12 and 13, first driving electrodes TE1 adjacent to each other in the second direction (Y-axis direction) are electrically connected to each other by a first connection electrode BE1, and first driving electrodes TE1 adjacent to each other in the first direction (X-axis direction) are electrically insulated from each other. In addition, first sensing electrodes RE1 adjacent to each other in the first direction (X-axis direction) are electrically connected to each other by a first connection portion CE1, and first sensing electrodes RE1 adjacent to each other in the second direction (Y-axis direction) are electrically insulated from each other. Therefore, a first capacitance Cm1 may occur (e.g., form) at crossings (e.g., intersections) of the first driving electrodes TE1 and the first sensing electrodes RE1. The sensor driver 330 may measure the skin moisture of a user by detecting a voltage charged in the first capacitance Cm1 in (e.g., during) a moisture measurement mode. In addition, the sensor driver 330 may determine the occurrence of the user's touch by detecting the voltage charged in the first capacitance Cm1 in (e.g., during) a touch sensing mode.

Because the first driving electrodes TE1, the first sensing electrodes RE1, the first conductive patterns DE1, and the first connection portion CE1 are on the same layer, they may be spaced apart from each other in a plan view. Gaps may exist between the first driving electrodes TE1, the first sensing electrodes RE1, the first conductive patterns DE1, and the first connection portion CE1. In FIG. 12, boundaries between the first driving electrodes TE1, the first sensing electrodes RE1, the first conductive patterns DE1, and the first connection portion CE1 are indicated by solid lines for ease of description.

Each of the first driving electrodes TE1 and the first sensing electrodes RE1 may include at least one bent portion. In FIG. 12, each of the first driving electrodes TE1 and the first sensing electrodes RE1 includes ten bent portions. However, embodiments are not limited thereto. Due to the bent portions, each of the first driving electrodes TE1 and the first sensing electrodes RE1 may include at least one protrusion and at least one recess.

In some embodiments, a first reference line RF1 and a second reference line RF2 that cross each other may be defined as shown in FIG. 12. Each of the first reference line RF1 and the second reference line RF2 may be a virtual straight line. A crossing (e.g., intersection) where the first reference line RF1 and the second reference line RF2 cross (e.g., intersect) each other is between the first sensing electrodes RE1 adjacent in the first direction (X-axis direction) and between the first driving electrode TE1 adjacent in the second direction (Y-axis direction). The first reference line RF1 and the second reference line RF2 may be perpendicular (e.g., substantially perpendicular) to each other.

Protrusion TV of the first driving electrode TE1 may be defined as a portion protruding from the first reference line RF1 or from the second reference line RF2. Recess TC of the first driving electrode TE1 may be defined as a portion recessed from the first reference line RF1 or from the second reference line RF2.

Protrusions and recesses of the first sensor electrodes SE1 may face each other. In some embodiments, the protrusions TV of each first driving electrode TE1 may face recesses RC of an adjacent first sensing electrode RE1. In addition, the recesses TC of each first driving electrode TE1 may face protrusions RV of the adjacent first sensing electrode RE1.

A width WT1 of each first driving electrode TE1 may be defined as a distance from the first reference line RF1 to an edge of the first driving electrode TE1 adjacent to a first conductive pattern DE1. The width WT1 of each first driving electrode TE1 may be, but is not limited to, about 790 μm to about 835 μm. In some embodiments, the width WT1 of each first driving electrode TE1 may be, but is not limited to, about 810 μm to about 815 μm.

A width WR1 of each first sensing electrode RE1 may be defined as a distance from the first reference line RF1 to an edge of the first sensing electrode RE1 adjacent to a first conductive pattern DE1. The width WR1 of each first sensing electrode RE1 may be the same or substantially the same as the width WT1 of each first driving electrode TE1.

A length WTP1 by which the protrusions TV of each first driving electrode TE1 protrude from the first reference line RF1 may be, but is not limited to, about 405 μm to about 450 μm. In some embodiments, the length WTP1 by which the protrusions TV of each first driving electrode TE1 protrude from the first reference line RF1 may be, but is not limited to, about 425 μm to about 430 μm.

A length WRP1 by which the protrusions RV of each first sensing electrode RE1 protrude from the first reference line RF1 may be the same or substantially the same as the length WTP1 by which the protrusions TV of each first driving electrode TE1 protrude from the first reference line RF1.

A first distance D1 between each first driving electrode TE1 and an adjacent first sensing electrode RE1 may be, but is not limited to, about 2 µm to about 90 µm. In some embodiments, the first distance D1 may be, but is not limited to, about 4 µm to about 5 µm.

In some embodiments where the first sensor electrodes SE1 include bent portions as described above, values of the first capacitance Cm1 of the first sensor electrodes SE1 may increase. Accordingly, because the sensitivity of the first sensor electrodes SE1 to the skin moisture of a user is improved, the skin moisture level can be determined more accurately.

The first driving electrodes TE1 and the first sensing electrodes RE1 may have a mesh or net shape. In some embodiments where the sensor electrode layer SEL including the first driving electrodes TE1 and the first sensing electrodes RE1 are directly on the thin-film encapsulation layer TFEL, as illustrated in FIG. 14, a distance between the second electrode of the light emitting element layer EML and each of the first driving electrodes TE1 and the first sensing electrodes RE1 of the sensor electrode layer SEL is small. Therefore, a large parasitic capacitance may occur (e.g., form) between the second electrode of the light emitting element layer EML and each of the first driving electrodes TE1 and the first sensing electrodes RE1. The parasitic capacitance is proportional to an overlap area between the second electrode of the light emitting element layer EML and each of the first driving electrodes TE1 and the first sensing electrodes RE1 of the sensor electrode layer SEL. Therefore, the first driving electrodes TE1 and the first sensing electrodes RE1 may have a mesh or net shape in order to reduce the parasitic capacitance.

In addition, when the first driving electrodes TE1 and the first sensing electrodes RE1 have a mesh or net shape, they may not overlap subpixels R, G and B of the first pixels SP1. In some embodiments, each of the first pixels SP1 may be a group of subpixels capable of expressing gray levels. In FIG. 13, each of the first pixels SP1 includes one first subpixel R, two second subpixels G, and one third subpixel B. However, embodiments are not limited thereto. For example, in some embodiments, each of the first pixels SP1 may include one first subpixel R, one second subpixel G, and one third subpixel B. In embodiments where the first driving electrodes TE1 and the first sensing electrodes RE1 have a mesh or net shape, it is possible to prevent or reduce the blocking of light output from the first to third subpixels R, G and B by the first driving electrodes TE1 and the first sensing electrodes RE1 and, thus, prevents or reduces a reduction in the luminance of the first to third subpixels R, G and B. In some embodiments, mesh or net shape structures of the first driving electrodes TE1 and the first sensing electrodes RE1 may overlap the pixel defining layer for defining light emitting areas of the first to third subpixels R, G and B.

Referring to FIGS. 12 and 13, the first connection electrode BE1 may include a first sub-connection electrode BE11, a second sub-connection electrode BE12, and a third sub-connection electrode BE13. Because the first driving electrodes TE1 adjacent to each other in the second direction (Y-axis direction) are connected by first to third sub-connection electrodes BE11, BE12 and BE13, even if any one of the first to third sub-connection electrodes BE11, BE12 and BE13 is cut off, the first driving electrodes TE1 adjacent to each other in the second direction (Y-axis direction) can be (e.g., remain) stably connected to each other. The first sub-connection electrode BE11, the second sub-connection electrode BE12, and the third sub-connection electrode BE13 may be connected to the first driving electrodes TE1 through first contact holes CNT1-1 and CNT1-2. Ends of the first sub-connection electrode BE11, the second sub-connection electrode BE12, and the third sub-connection electrode BE13 may be connected to any one of the first driving electrodes TE1 adjacent to each other in the second direction (Y-axis direction) through $(1\text{-}1)^{th}$ contact holes CNT1-1. The other ends of the first sub-connection electrode BE11, the second sub-connection electrode BE12, and the third sub-connection electrode BE13 may be connected to the other one of the first driving electrodes TE1 adjacent to each other in the second direction (Y-axis direction) through $(1\text{-}2)^{th}$ contact holes CNT1-2.

The first connection electrode BE1 may overlap the first driving electrodes TE1 and the first sensing electrodes RE1. In addition, the first connection electrode BE1 may overlap the first connection portion CE1. The first connection electrode BE1 is on a different layer from the first driving electrodes TE1, the first sensing electrodes RE1, and the first connection portion CE1. Therefore, even if the first connection electrode BE1 overlaps the first driving electrodes TE1, the first sensing electrodes RE1 or the first connection portion CE1, it may not short-circuit to the first driving electrodes TE1, the first sensing electrodes RE1, or the first connection portion CE1.

Although the first connection electrode BE1 is shown to include three sub-connection electrodes BE11 through BE13 in FIG. 12, the number of the sub-connection electrodes is not limited thereto. For example, in some embodiments, the first connection electrode BE1 may include any suitable number of sub-connection electrodes, such as, for example, five or more sub-connection electrodes.

The first connection portion CE1 may be between the first sensing electrodes RE1. The first connection portion CE1 may be on the same layer as the first sensing electrodes RE1 and may extend from the first sensing electrodes RE1. Therefore, the first connection portion CE1 may be connected to the first sensing electrodes RE1 without contact holes.

Referring again to FIG. 11, the first conductive patterns DE1 may be electrically isolated from the first driving electrodes TE1 and the first sensing electrodes RE1. The first driving electrodes TE1, the first sensing electrodes RE1, and the first conductive patterns DE1 may be spaced apart from each other. Each of the first conductive patterns DE1 may be surrounded by each of the first driving electrodes TE1 and/or the first sensing electrodes RE1.

Due to the first conductive patterns DE1, the parasitic capacitance between the second electrode of the light emitting element layer EML and each of the first driving electrodes TE1 and the first sensing electrodes RE1 may be reduced. The reduced parasitic capacitance may increase the speed at which the first capacitance Cm1 between each of the first driving electrodes TE1 and each of the first sensing electrodes RE1 is charged. However, if the area of each first driving electrode TE1 and the area of each first sensing electrode RE1 are excessively reduced due to the first conductive patterns DE1, then the first capacitance Cm1 between each of the first driving electrodes TE1 and each of the first sensing electrodes RE1 may be reduced and, thus, may be more affected by noise. Therefore, the area of each first conductive pattern DE1 may be set suitably or appropriately in consideration of the parasitic capacitance and the mutual capacitance. The area of each first conductive pattern DE1 may be smaller than the area of each first driving electrode TE1 and the area of each first sensing electrode RE1.

The first conductive patterns DE1 may have any suitable shape, such as, for example, a mesh or net shape.

Although the first conductive patterns DE1 are shown to have a rhombic shape in FIG. 11, the shape of each of the first conductive patterns DE1 is not limited thereto.

The second sensor electrodes SE2 and the second conductive patterns DE2 may be in the second area A2.

The second sensor electrodes SE2 may include second driving electrodes TE2 and second sensing electrodes RE2.

The second sensing electrodes RE2 may be arranged in the first direction (X-axis direction) (e.g., arranged in lines in the first direction) and electrically connected to each other. The second driving electrodes TE2 may be arranged in the second direction (Y-axis direction) (e.g., arranged in lines in the second direction) crossing (e.g., intersecting) the first direction (X-axis direction) and may be electrically connected to each other. The second driving electrodes TE2 and the second sensing electrodes RE2 may be electrically isolated from each other. The second driving electrodes TE2 and the second sensing electrodes RE2 may be spaced apart from each other. The second driving electrodes TE2 may be parallel (e.g., substantially parallel) to each other in the second direction (Y-axis direction). For example, the second driving electrodes TE2 may be arranged in lines in the second direction (Y-axis direction), and the lines of second driving electrodes TE2 may be parallel (e.g., substantially parallel) to each other.

Referring to FIG. 15, second driving electrodes TE2 adjacent to each other in the second direction (Y-axis direction) are electrically connected to each other by a second connection electrode BE2, and second driving electrodes TE2 adjacent to each other in the first direction (X-axis direction) are electrically insulated from each other. In addition, second sensing electrodes RE2 adjacent to each other in the first direction (X-axis direction) are electrically connected to each other by a second connection portion CE2, and second sensing electrodes RE2 adjacent to each other in the second direction (Y-axis direction) are electrically insulated from each other. Therefore, a second capacitance Cm2 may occur (e.g., form) at crossings (e.g., intersections) of the second driving electrodes TE2 and the second sensing electrodes RE2. The sensor driver 330 may determine the occurrence of a user's touch by detecting a voltage charged in the second capacitance Cm2 in the touch sensing mode.

Because the second driving electrodes TE2, the second sensing electrodes RE2, the second conductive patterns DE2, and the second connection portion CE2 are on the same layer, they may be spaced apart from each other in a plan view. Gaps may exist between the second driving electrodes TE2, the second sensing electrodes RE2, the second conductive patterns DE2, and the second connection portion CE2. In FIG. 15, boundaries between the second driving electrodes TE2, the second sensing electrodes RE2, the second conductive patterns DE2, and the second connection portion CE2 are indicated by solid lines for ease of description.

Edges of the second sensor electrodes SE2, such as, for example, the second driving electrodes TE2 and the second sensing electrodes RE2, may extend along the first reference line RF1 without being bent. For example, in some embodiments, the edges of the second driving electrodes TE2 and the second sensing electrodes RE2 may be parallel (e.g., substantially parallel) to the first reference line RF1. Accordingly, values of the second capacitance Cm2 of the second sensor electrodes SE2 may be smaller than the values of the first capacitance Cm1 of the first sensor electrodes SE1 including bent portions.

A second distance D2 between each second driving electrode TE2 and an adjacent second sensing electrodes RE2 may be greater than the first distance D1 between each first driving electrode TE1 and an adjacent first sensing electrodes RE1.

A width WT2 of each second driving electrode TE2 may be defined as a distance from the first reference line RF1 to an edge of the second driving electrode TE2 adjacent to a second conductive pattern DE2.

The width WT2 of each second driving electrode TE2 may be greater than the width WT1 of each first driving electrode TE1. For example, the width WT2 of each second driving electrode TE2 may be, but is not limited to, about 1000 μm or more. In some embodiments, the width WT2 of each second driving electrode TE2 may be, but is not limited to, about 1010 μm or more.

A width WR2 of each second sensing electrode RE2 may be defined as a distance from the first reference line RF1 to an edge of the second sensing electrode RE2 adjacent to a second conductive pattern DE2. The width WR2 of each second sensing electrode RE2 may be the same or substantially the same as the width WT2 of each second driving electrode TE2.

The second driving electrodes TE2 and the second sensing electrodes RE2 may have a mesh or net shape. When the second driving electrodes TE2 and the second sensing electrodes RE2 have a mesh shape or net shape, the parasitic capacitance between the second electrode of the light emitting element layer EML and each of the second driving electrodes TE2 and the second sensing electrodes RE2 can be minimized or reduced, and a reduction in the luminance of light can be prevented or reduced, as described above.

Referring to FIGS. 15 to 17, the second connection electrode BE2 may be on a different layer than the second driving electrodes TE2 and may be connected to the second driving electrodes TE2 through second contact holes CNT2-1 and CNT2-2. An end of the second connection electrode BE2 may be connected to any one of the second driving electrodes TE2 adjacent to each other in the second direction (Y-axis direction) through $(2\text{-}1)^{th}$ contact holes CNT2-1. The other end of the second connection electrode BE2 may be connected to the other one of the second driving electrodes TE2 adjacent to each other in the second direction (Y-axis direction) through $(2\text{-}2)^{th}$ contact holes CNT2-2.

The second connection electrode BE2 may overlap the second driving electrodes TE2 and the second sensing electrodes RE2. In addition, the second connection electrode BE2 may overlap the second connection portion CE2. The second connection electrode BE2 is on a different layer than the second driving electrodes TE2, the second sensing electrodes RE2, and the second connection portion CE2. Therefore, even if the second connection electrode BE2 overlaps the second driving electrodes TE2, the second sensing electrodes RE2 or the second connection portion CE2, it may not short-circuit to the second driving electrodes TE2, the second sensing electrodes RE2, or the second connection portion CE2, as described above.

Although the second driving electrodes TE2 are shown to be connected by one second connection electrode BE2 in FIG. 15, embodiments are not limited thereto. For example, in some embodiments, the second connection electrode BE2 may include any suitable number of sub-connection electrodes, such as, for example, three or more sub-connection electrodes. However, in some embodiments, the number of sub-connection electrodes of the second connection electrode BE2 may be smaller than the number of sub-connection electrodes of the first connection electrode BE1 described above. For example, in some embodiments, when the second connection electrode BE2 is composed of N sub-connection electrodes, the first connection electrode BE1 may be composed of (N+2) sub-connection electrodes.

The second connection portion CE2 may be between the second sensing electrodes RE2. The second connection portion CE2 may be on the same layer as the second sensing electrodes RE2 and may extend from the second sensing electrodes RE2. Therefore, the second connection portion CE2 may be connected to the second sensing electrodes RE2 without contact holes.

Referring again to FIG. 11, the second conductive patterns DE2 may be electrically isolated from the second driving electrodes TE2 and the second sensing electrodes RE2. The second driving electrodes TE2, the second sensing electrodes RE2, and the second conductive patterns DE2 may be spaced apart from each other. Each of the second conductive patterns DE2 may be surrounded by each of the second driving electrodes TE2 and/or the second sensing electrodes RE2.

Due to the second conductive patterns DE2, the parasitic capacitance between the second electrode of the light emitting element layer EML and each of the second driving electrodes TE2 and the second sensing electrodes RE2 may be reduced. The reduced parasitic capacitance may increase the speed at which the second capacitance Cm2 between each of the second driving electrodes TE2 and each of the second sensing electrodes RE2 is charged. However, if the area of each second driving electrode TE2 and the area of each second sensing electrode RE2 are excessively reduced due to the second conductive patterns DE2, the second capacitance Cm2 between each of the second driving electrodes TE2 and each of the second sensing electrodes RE2 may be reduced and, thus, may be more affected by noise. Therefore, the area of each second conductive pattern DE2 may be set suitably or appropriately in consideration of the parasitic capacitance and the mutual capacitance.

The area of each second conductive pattern DE2 may be smaller than the area of each second driving electrode TE2 and the area of each second sensing electrode RE2. In addition, the area of each second conductive pattern DE2 may be smaller than the area of each first conductive pattern DE1 described above, but embodiments are not limited thereto.

The second conductive patterns DE2 may have any suitable shape, such as, for example, a mesh or net shape.

Although the second conductive patterns DE2 are shown to have a rhombic shape in FIG. 11, the shape of each of the second conductive patterns DE2 is not limited thereto.

As described above, according to some embodiments, because the first sensor electrodes SE1 for measuring skin moisture include bent portions, the sensitivity of the first sensor electrodes SE1 may be improved. Therefore, it is possible to determine a user's skin moisture level more accurately. In addition, because the second sensor electrodes SE2 in the second area A2 do not include bent portions, it is possible to minimize or reduce a phenomenon in which the boundary between the first area A1 and the second area A2 is visible due to a difference in pixel density between the first area A1 and the second area A2.

The sensor wirings TL1, TL2 and RL may be in the sensor peripheral area SPA. The sensor wirings TL1, TL2 and RL may include sensing lines RL connected to the sensing electrodes RE1 and RE2 of the sensor electrodes SE1 and SE2 and driving lines TL1 and TL2 connected to the driving electrodes TE1 and TE2 of the sensor electrodes SE1 and SE2.

First sensing electrodes RE1 and second sensing electrodes RE2 on a side of the sensor area SA may be connected to the sensing lines RL. For example, rightmost sensing electrodes among the first sensing electrodes RE1 and the second sensing electrodes RE2 electrically connected in the first direction (X-axis direction) may be connected to the sensing lines RL as illustrated in FIG. 11. The sensing lines RL may be connected to second sensor pads TP2. Therefore, the sensor driver 330 may be electrically connected to the first and second sensing electrodes RE1 and RE2.

Second driving electrodes TE2 on a side of the second area A2 of the sensor area SA may be connected to first driving lines TL1. First driving electrodes TE1 on a side of the first area A1 of the sensor area SA may be connected to second driving lines TL2. For example, the side of the second area A2 where the second driving electrodes TE2 are connected to first driving lines TL1 may be a bottom side of the sensor area SA, and the side of the first area A1 where the first driving electrodes TE1 are connected to second driving lines TL2 may be a top side of the sensor area SA. Here, the bottom side and the top side of the sensor area SA may be opposite each other. For example, as illustrated in FIG. 11, bottommost second driving electrodes TE2 among the second driving electrodes TE2 electrically connected in the second direction (Y-axis direction) may be connected to the first driving lines TL1, and topmost first driving electrodes TE1 among the first driving electrodes TE1 electrically connected in the second direction (Y-axis direction) may be connected to the second driving lines TL2. The second driving lines TL2 may extend along a left side of the sensor peripheral area SPA and then may be connected to the first driving electrodes TE1 at the top side of the sensor area SA. The first driving lines TL1 and the second driving lines TL2 may be connected to first sensor pads TP1. Therefore, the sensor driver 330 may be electrically connected to the driving electrodes TE1 and TE2.

A first guard line GL1 may be outside an outermost sensing line RL among the sensing lines RL. For example, the sensing lines RL may extend along the sensor peripheral area SPA, and the first guard line GL1 may extend adjacently to the sensing lines RL and may be closer to the outer edge of the sensing unit SU than the sensing lines RL. In addition, a first ground line GRL1 may be outside the first guard line GL1. The first guard line GL1 may be on a right side of the rightmost sensing line RL among the sensing lines RL, and the first ground line GRL1 may be on a right side of the first guard line GL1.

A second guard line GL2 may be between an innermost sensing line RL among the sensing lines RL and a rightmost first driving line TL1 among the first driving lines TL1. The innermost sensing line RL among the sensing lines RL may be a leftmost sensing line RL among the sensing lines RL. In addition, the second guard line GL2 may be between the rightmost first driving line TL1 among the first driving lines TL1 and a second ground line GRL2.

A third guard line GL3 may be between the innermost sensing line RL among the sensing lines RL and the second ground line GRL2. The second ground line GRL2 may be connected to a rightmost first sensor pad TP1 among the first sensor pads TP1 and a leftmost second sensor pad TP2 among the second sensor pads TP2.

A fourth guard line GL4 may be outside an outermost second driving line TL2 among the second driving lines TL2. For example, the fourth guard line GL4 may be on a left side of a leftmost second driving line TL2 among the second driving lines TL2.

In addition, a third ground line GRL3 may be outside the fourth guard line GL4. For example, the fourth guard line GL4 may be on left and top sides of a leftmost and topmost second driving line TL2 among the second driving lines TL2, and the third ground line GRL3 may be on left and top sides of the fourth guard line GL4.

A fifth guard line GL5 may be inside an innermost second driving line TL2 among the second driving lines TL2. For example, the fifth guard line GL5 may be between a rightmost second driving line TL2 among the second driving lines TL2 and the first and second sensor electrodes SE1 and SE2.

A ground voltage may be applied to the first ground line GRL1, the second ground line GRL2, and the third ground line GRL3. In addition, the ground voltage may be applied to the first guard line GL1, the second guard line GL2, the third guard line GL3, the fourth guard line GL4, and the fifth guard line GL5.

According to some embodiments illustrated in FIG. 11, because the first guard line GL1 is between the outermost sensing line RL and the first ground line GRL1, it may minimize or reduce the effect of a voltage change of the first ground line GRL1 on the outermost sensing line RL. The second guard line GL2 is between the innermost sensing line RL and the rightmost first driving line TL1. Therefore, the second guard line GL2 may minimize or reduce the effect of voltage changes of the innermost sensing line RL and the rightmost first driving line TL1 on each other. Because the third guard line GL3 is between the innermost sensing line RL and the second ground line GRL2, it may minimize or reduce the effect of a voltage change of the second ground line GRL2 on the innermost sensing line RL. Because the fourth guard line GL4 is between the outermost second driving line TL2 and the third ground line GRL3, it may minimize or reduce the effect of a voltage change of the third ground line GRL3 on the outermost second driving line TL2. Because the fifth guard line GL5 is between the innermost second driving line TL2 and the sensor electrodes SE1 and SE2, it may minimize or reduce the effect of the innermost second driving line TL2 and the sensor electrodes SE1 and SE2 on each other.

The cross-sectional structure of the pixels SP1 and SP2 will now be described in more detail. Because the first and second pixels SP1 and SP2 have the same or substantially the same cross-sectional structure and/or are composed of similar elements, they will be described together with reference to FIGS. 14 and 17.

Referring to FIGS. 14 and 17, the thin-film transistor layer TFTL is on the substrate SUB. The thin-film transistor layer TFTL includes thin-film transistors 120, a gate insulating layer 130, an interlayer insulating film 140, a protective layer 150, and a planarization layer 160.

A buffer layer BF may be on a surface of the substrate SUB. The buffer layer BF may be on the surface of the substrate SUB to protect the thin-film transistors 120 and light emitting layers 172 of the light emitting element layer EML from moisture introduced through the substrate SUB, which is vulnerable to moisture penetration. The buffer layer BF may include a plurality of inorganic layers stacked alternately. For example, the buffer layer BF may be a multilayer in which one or more inorganic layers selected from a silicon nitride layer, a silicon oxynitride layer, a silicon oxide layer, a titanium oxide layer, and an aluminum oxide layer are alternately stacked. In some embodiments, the buffer layer BF can be omitted.

The thin-film transistors 120 are on the buffer layer BF. Each of the thin-film transistors 120 includes an active layer 121, a gate electrode 122, a source electrode 123, and a drain electrode 124. In FIGS. 14 and 17, each of the thin-film transistors 120 has a top-gate type (e.g., structure) in which the gate electrode 122 is located above the active layer 121. However, embodiments are not limited thereto. For example, in some embodiments, each of the thin-film transistors 120 may have a bottom-gate type (e.g., structure), in which the gate electrode 122 is located below the active layer 121, or a double-gate type, in which the gate electrode 122 is located both above and below the active layer 121.

The active layers 121 are on the buffer layer BF. The active layers 121 may include polycrystalline silicon, monocrystalline silicon, low-temperature polycrystalline silicon, amorphous silicon, and/or an oxide semiconductor. Some examples of the oxide semiconductor may include binary compounds (ABx), ternary compounds (ABxCy) and/or quaternary compounds (ABxCyDz) containing indium, zinc, gallium, tin, titanium, aluminum, hafnium (Hf), zirconium (Zr), magnesium (Mg), etc. For example, the active layers 121 may include ITZO (an oxide including indium, tin, and titanium) and/or IGZO (an oxide including indium, gallium, and tin). A light shielding layer may be between the buffer layer BF and the active layers 121 to prevent or reduce the transmission of external light to the active layers 121.

The gate insulating layer 130 may be on the active layers 121. The gate insulating layer 130 may include an inorganic layer such as a silicon nitride layer, a silicon oxynitride layer, a silicon oxide layer, a titanium oxide layer, and/or an aluminum oxide layer. In FIGS. 14 and 17, the gate insulating layer 130 is in areas overlapping the gate electrodes 122 and also in an areas not overlapping the gate electrodes 122. However, embodiments are not limited thereto. For example, in some embodiments, the gate insulating layer 130 may be only in the areas overlapping the gate electrodes 122.

The gate electrodes 122 and gate lines may be on the gate insulating layer 130. Each of the gate electrodes 122 and the gate lines may be a single layer or a multilayer including any one or more selected from molybdenum (Mo), aluminum (Al), chromium (Cr), gold (Au), titanium (Ti), nickel (Ni), neodymium (Ne), copper (Cu), and alloys thereof.

The interlayer insulating film 140 may be on the gate electrodes 122 and the gate lines. The interlayer insulating film 140 may include an inorganic layer such as a silicon nitride layer, a silicon oxynitride layer, a silicon oxide layer, a titanium oxide layer, and/or an aluminum oxide layer.

The source electrodes 123 and the drain electrodes 124 may be on the interlayer insulating film 140. Each of the source electrodes 123 and the drain electrodes 124 may be connected to an active layer 121 through a contact hole penetrating the gate insulating layer 130 and the interlayer insulating film 140. Each of the source electrodes 123 and the drain electrodes 124 may be a single layer or a multilayer including any one or more selected from molybdenum (Mo), aluminum (Al), chromium (Cr), gold (Au), titanium (Ti), nickel (Ni), neodymium (Ne), copper (Cu), and alloys thereof.

The protective layer 150 for insulating the thin-film transistors 120 may be on the source electrodes 123 and the drain electrodes 124. The protective layer 150 may include an inorganic layer such as a silicon nitride layer, a silicon oxynitride layer, a silicon oxide layer, a titanium oxide layer, and/or an aluminum oxide layer.

The planarization layer 160 may be on the protective layer 150 to planarize steps due to (e.g., caused by) the thin-film transistors 120. The planarization layer 160 may include an organic layer such as acryl resin, epoxy resin, phenolic resin, polyamide resin, and/or polyimide resin.

The light emitting element layer EML is on the thin-film transistor layer TFTL. The light emitting element layer EML may include light emitting elements 170 and a pixel defining layer 180.

The light emitting elements 170 and the pixel defining layer 180 are on the planarization layer 160. Each of the light emitting elements 170 may include a first electrode 171, the light emitting layer 172, and a second electrode 173.

The first electrodes 171 may be on the planarization layer 160. In FIGS. 14 and 17, the first electrodes 171 are connected to the drain electrodes 124 of the thin-film transistors 120 through contact holes penetrating the protective layer 150 and the planarization layer 160. However, embodiments are not limited thereto. For example, in some embodiments, the first electrodes 171 may also be connected to the source electrodes 123 of the thin-film transistors 120 through contact holes penetrating the protective layer 150 and the planarization layer 160.

In some embodiments where the light emitting elements 170 have a top emission structure in which light is emitted from the light emitting layers 172 toward the second electrode 173, the first electrodes 171 may include a metal material having high reflectivity, such as, for example, a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu).

In some embodiments where the light emitting elements 170 have a bottom emission structure in which light is emitted from the light emitting layers 172 toward the first electrodes 171, the first electrodes 171 may include a transparent conductive material (TCO) capable of transmitting light, such as, for example, ITO or IZO, or a semi-transmissive conductive material such as, for example, magnesium (Mg), silver (Ag) or an alloy of Mg and/or Ag. In some embodiments, when the first electrodes 171 include a semi-transmissive conductive material, the light output efficiency may be increased by a microcavity.

The pixel defining layer 180 may be on the planarization layer 160 to separate the first electrodes 171 and, thus, to serve as a pixel defining layer for defining the first to third subpixels R, G and B described above. The pixel defining layer 180 may cover edges of the first electrodes 171. The pixel defining layer 180 may include an organic layer such as acryl resin, epoxy resin, phenolic resin, polyamide resin, and/or polyimide resin.

Each of the first to third subpixels R, G and B includes an area where the first electrode 171, the light emitting layer 172, and the second electrode 173 are sequentially stacked so that holes from the first electrode 171 and electrons from the second electrode 173 combine together in the light emitting layer 172 to emit light. Second subpixels G and third subpixels B may have the same or substantially the same structure as first subpixels R, as illustrated in FIGS. 14 and 17.

The light emitting layers 172 are on the first electrodes 171 and the pixel defining layer 180. Each of the light emitting layers 172 may include an organic material and emit light of a predetermined (e.g., set) color. For example, each of the light emitting layers 172 may include a hole transporting layer, an organic material layer, and an electron transporting layer. In some embodiments, the light emitting layers 172 of red subpixels (e.g., first subpixels R) may emit red light, the light emitting layers 172 of green subpixels (e.g., second subpixels G) may emit green light, and the light emitting layers 172 of blue subpixels (e.g., third subpixels B) may emit blue light.

In some embodiments, the light emitting layers 172 of the first to third subpixels R, G and B may form one layer and emit white light, ultraviolet light, and/or blue light. In some embodiments, the red subpixels (e.g., first subpixels R) may overlap red color filter layers which transmit red light, the green subpixels (e.g., second subpixels G) may overlap green color filter layers which transmit green light, and the blue subpixels (e.g., third subpixels B) may overlap blue color filter layers which transmit blue light. The red color filter layers, the green color filter layers, and the blue color filter layers may be on the thin-film encapsulation layer TFEL. In addition, the red subpixels (e.g., first subpixels R) may overlap red wavelength conversion layers which convert ultraviolet light and/or blue light into red light, the green subpixels (e.g., second subpixels G) may overlap green wavelength conversion layers which convert ultraviolet light and/or blue light into green light, and the blue subpixels (e.g., third subpixels B) may overlap blue wavelength conversion layers which convert ultraviolet light and/or blue light into blue light. The red wavelength conversion layers, the green wavelength conversion layers, and the blue wavelength conversion layers may be on the thin-film encapsulation layer TFEL. For example, the red wavelength conversion layers may be between the thin-film encapsulation layer TFEL and the red color filter layers, the green wavelength conversion layers may be between the thin-film encapsulation layer TFEL and the green color filter layers, and the blue wavelength conversion layers may be between the thin-film encapsulation layer TFEL and the blue color filter layers.

The second electrode 173 is on the light emitting layers 172. The second electrode 173 may cover the light emitting layers 172. The second electrode 173 may be a common layer common to all of the pixels SP1 and SP2. A capping layer may be on the second electrode 173.

In embodiments where the light emitting elements 170 have a top emission structure, the second electrode 173 may include a transparent conductive material (TCO) capable of transmitting light, such as, for example, ITO and/or IZO, or a semi-transmissive conductive material such as, for example, magnesium (Mg), silver (Ag) or an alloy of Mg and Ag. When the second electrode 173 includes a semi-transmissive conductive material, the light output efficiency may be increased by a microcavity.

In embodiments where the light emitting elements 170 have a bottom emission structure, the second electrode 173 may include a metal material having high reflectivity, such as, for example, a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu).

The thin-film encapsulation layer TFEL is on the light emitting element layer EML. The thin-film encapsulation layer TFEL is on the second electrode 173. The thin-film encapsulation layer TFEL may include at least one inorganic layer to prevent or reduce the penetration of oxygen and/or moisture into the light emitting layers 172 and the second electrode 173. In addition, the thin-film encapsulating layer TFEL may include at least one organic layer to protect the light emitting element layer EML from foreign substances such as, for example, dust. For example, the thin-film encapsulating layer TFEL may include a first inorganic layer on the second electrode 173, an organic layer on the first inorganic layer, and a second inorganic layer on the organic layer. The first inorganic layer and the second inorganic layer may include a silicon nitride layer, a silicon oxynitride layer, a silicon oxide layer, a titanium oxide layer, and/or an aluminum oxide layer, but embodiments are not limited thereto. The organic layer may include acryl resin, epoxy resin, phenolic resin, polyamide resin, polyimide resin, etc., but embodiments are not limited thereto.

The sensor electrode layer SEL is on the thin-film encapsulation layer TFEL. A buffer layer may be between the thin-film encapsulation layer TFEL and the sensor electrode layer SEL. The sensor electrode layer SEL may include a first sensor electrode layer TCL1 and a second sensor electrode layer TCL2.

The first sensor electrode layer TCL1 is on the thin-film encapsulation layer TFEL. The first sensor electrode layer TCL1 may include the first and second connection electrodes BE1 and BE2. The first sensor electrode TCL1 may include a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide, but embodiments are not limited thereto.

A first touch insulating layer TINS1 is on the first sensor electrode layer TCL1. The first touch insulating layer TINS1 may include an inorganic layer such as a silicon nitride layer, a silicon oxynitride layer, a silicon oxide layer, a titanium oxide layer, and/or an aluminum oxide layer. In some embodiments, the first touch insulating layer TINS1 may include an organic layer such as acryl resin, epoxy resin, phenolic resin, polyamide resin, and/or polyimide resin.

The second sensor electrode layer TCL2 is on the first touch insulating layer TINS1. The second sensor electrode layer TCL2 may include the driving electrodes TE1 and TE2, the sensing electrodes RE1 and RE2, the conductive patterns DE1 and DE2, the connection portions CE1 and CE2, the driving lines TL1 and TL2, the sensing lines RL, the guard lines GL1 through GL5, and the first to third ground lines CRL1 to CRL3. The second sensor electrode layer TCL2 may include a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide, but embodiments are not limited thereto.

The contact holes CNT1-1, CNT1-2, CNT2-1 and CNT2-2 may be in the first touch insulating layer TINS1 to penetrate through the first touch insulating layer TINS1 and expose the connection electrodes BE1 and BE2. The driving electrodes TE1 and TE2 may be connected to the connection electrodes BE1 and BE2 through the respective contact holes CNT1-1, CNT1-2, CNT2-1 and CNT2-2.

A second touch insulating layer TINS2 is on the second sensor electrode layer TCL2. The second touch insulating layer TINS2 may planarize steps formed by (e.g., caused by) the first sensor electrode layer TCL1 and the second sensor electrode layer TCL2. The second touch insulating layer TINS2 may include an organic layer such as acryl resin, epoxy resin, phenolic resin, polyamide resin, and/or polyimide resin.

Display devices according to embodiments will now be described in more detail. In the following embodiments, the same elements as those described above will be indicated by the same reference numerals, and a redundant description thereof will not be repeated here, or will be given briefly.

FIG. 18 is an enlarged view of area A of FIG. 11, according to some embodiments.

Referring to FIG. 18, the first sensor electrodes according to some embodiments are different from those of some of the embodiments of FIG. 12 in shapes of first driving electrodes TE1', first sensing electrodes RE1', and first conductive pattern DE1'.

Each of the first conductive patterns DE1' may include a first side S1 extending in the first direction (X-axis direction), a second side S2 extending in the second direction (Y-axis direction), and a third side S3 connecting the first side S1 and the second side S2. The shape of each of the first conductive patterns DE1' may determine shapes of edges of a first driving electrode TE1' or a first sensing electrode RE1' adjacent to the first conductive pattern DE1'.

A width WT1' of each first driving electrode TE1' may be defined as a distance from a first reference line RF1 to an edge of the first driving electrode TE1' adjacent to a first conductive pattern DE1'. Therefore, the width WT1' of each first driving electrode TE1' may be at a minimum at an edge of the first driving electrode TE1' adjacent to the third side S3 which is closest to the first reference line RF1 among the first side S1, the second side S2, and the third side S3 of the first conductive pattern DE1'.

A minimum value WT1M of the width WT1' of each first driving electrode TE1' may be, but is not limited to, about 405 μm to about 450 μm. For example, in some embodiments, the minimum value WT1M of the width WT1' of each first driving electrode TE1' may be, but is not limited to, about 425 μm to about 430 μm.

A width WR1' of each first sensing electrode RE1' may be defined as a distance from the first reference line RF1 to an edge of the first sensing electrode RE1' adjacent to a first conductive pattern DE1'. Therefore, as described above, the width WR1' of each first sensing electrode RE1' may be at a minimum at an edge of the first sensing electrode RE1' adjacent to the third side S3 which is closest to the first reference line RF1 among the first side S1, the second side S2, and the third side S3 of the first conductive pattern DE1'.

A minimum value WR1M of the width WR1' of each first sensing electrode RE1' may be the same or substantially the same as the minimum value WT1M of the width WT1' of each first driving electrode TE1'.

A length WTP1' by which protrusions TV of each first driving electrode TE1' protrude from the first reference line RF1 may be, but is not limited to, about 190 μm to about 235 μm. For example, in some embodiments, the length WTP1' by which the protrusions TV of each first driving electrode TE1' protrude from the first reference line RF1 may be, but is not limited to, about 210 μm to about 215 μm.

A length WRP1' by which protrusions RV of each first sensing electrode RE1' protrude from the first reference line RF1 may be the same or substantially the same as the length WTP1' by which the protrusions TV of each first driving electrode TE1' protrude from the first reference line RF1.

As described above, when the first driving electrodes TE1' and the first sensing electrodes RE1' include protrusions and recesses, values of the first capacitance Cm1 of the first driving electrodes TE1' and the first sensing electrodes RE1' may increase. Accordingly, because the sensitivity of the first driving electrodes TE1' and the first sensing electrodes RE1' to the skin moisture of a user is improved, the skin moisture level can be determined more accurately, as described above.

Other details of the first driving electrodes TE1', the first sensing electrodes RE1' and the first conductive patterns DE1' may be the same or substantially the same or similar to those of the first driving electrodes TE1, the first sensing electrodes RE1, and the first conductive patterns DE1 described above with reference to FIG. 12, and thus a redundant description thereof will not be repeated here.

Although some embodiments of the present disclosure have been disclosed for illustrative purposes, those skilled in the art will appreciate that various modifications, additions and substitutions are possible, without departing from the scope and spirit of the disclosure as defined by the accompanying claims and equivalents thereof.

What is claimed is:

1. A display device comprising:
a display panel which comprises a first area and a second area; and
a sensor device which overlaps the first area in a thickness direction of the display panel and is under the display panel,
wherein the display panel comprises first sensor electrodes in the first area and second sensor electrodes in the second area, and a shape of a first sensor electrode of the first sensor electrodes is different from a shape of a second sensor electrode of the second sensor electrodes,
wherein the first sensor electrode comprises protrusions protruding from a first reference line and recesses recessed from the first reference line,
wherein the first sensor electrode comprises first driving electrodes and first sensing electrodes,
wherein the first reference line crosses a second reference line,
wherein a point between two first sensing electrodes of the first sensing electrodes adjacent in a first direction is between two first driving electrodes of the first driving electrodes adjacent in a second direction crossing the first direction,
wherein a crossing where the first reference line and the second reference line cross each other is at the point, and
wherein each of the two first sensing electrodes and the two first driving electrodes comprises a respective one of the protrusions that protrudes from the first reference line.

2. The display device of claim 1, wherein an edge of the first sensor electrode comprises a plurality of bent portions.

3. The display device of claim 1, wherein each of the first reference line and the second reference line is a virtual straight line.

4. The display device of claim 1, wherein the protrusions and the recesses face each other.

5. The display device of claim 4, wherein a length by which the protrusions protrude from the first reference line is about 100 μm to about 600 μm.

6. The display device of claim 1, wherein edges of the second sensor electrodes are parallel to the first reference line.

7. The display device of claim 1, wherein the second sensor electrodes comprise second driving electrodes and second sensing electrodes, and a first distance between each of the first driving electrodes and an adjacent first sensing electrode is smaller than a second distance between each of the second driving electrodes and an adjacent second sensing electrode.

8. A display device comprising:
a display panel which comprises a first area and a second area; and
a sensor device which overlaps the first area in a thickness direction of the display panel,
wherein the display panel comprises first sensor electrodes in the first area and second sensor electrodes in the second area, and a shape of a first sensor electrode of the first sensor electrodes is different from a shape of a second sensor electrode of the second sensor electrodes,
the first sensor electrodes comprise first driving electrodes and first sensing electrodes, the second sensor electrodes comprise second driving electrodes and second sensing electrodes, and a first distance between each of the first driving electrodes and an adjacent first sensing electrode is smaller than a second distance between each of the second driving electrodes and an adjacent second sensing electrode,
the display device further comprises:
first connection electrodes which connect first driving electrodes adjacent in a second direction; and
second connection electrodes which connect second driving electrodes adjacent in a second direction, and
each first connection electrode comprises two or more first sub-connection electrodes, each second connection electrode comprises one or more second sub-connection electrodes, and a number of the first sub-connection electrodes is greater than a number of the second sub-connection electrodes.

9. The display device of claim 1, further comprising:
first conductive patterns which are electrically isolated from the first sensor electrodes; and
second conductive patterns which are electrically isolated from the second sensor electrodes.

10. The display device of claim 9, wherein the first conductive patterns are surrounded by the first sensor electrodes, and the second conductive patterns are surrounded by the second sensor electrodes.

11. The display device of claim 9, wherein an area of each of the first conductive patterns is larger than an area of each of the second conductive patterns.

12. A display device comprising:
a display panel which comprises a first area and a second area;
first pixels in the first area and second pixels in the second area; and
a sensor device which overlaps the first area in a thickness direction and is under the display panel,
wherein the display panel comprises first sensor electrodes in the first area and second sensor electrodes in the second area, and values of a first mutual capacitance of the first sensor electrodes are different from values of a second mutual capacitance of the second sensor electrodes,
wherein a number of the first pixels per unit area in the first area is smaller than a number of the second pixels per unit area in the second area, and
wherein the first area further comprises a transmitting portion overlapping the sensor device in the thickness direction and not overlapping the first pixels, the transmitting portion having a first breadth in a first direction greater than or equal to a distance spanned by a plurality of first pixels of the first pixels arranged with each other along the first direction.

13. The display device of claim 12, wherein a skin moisture level is calculated by detecting a voltage charged in the first mutual capacitance.

14. The display device of claim 12, wherein the values of the first mutual capacitance are greater than the values of the second mutual capacitance.

15. The display device of claim 12, wherein the transmitting portion is surrounded by the first pixels.

16. The display device of claim 12, wherein each of the first and second pixels comprises a first electrode, a pixel defining layer having an opening that exposes the first electrode, a light emitting layer on the first electrode, and a second electrode on the light emitting layer.

17. The display device of claim 12, wherein an area of the first area is smaller than an area of the second area.

18. The display device of claim 1, wherein a first driving electrode of the first driving electrodes is entirely surrounded in a plan view by first sensing electrodes of the first sensing electrodes adjacent to the first driving electrode.

19. The display device of claim 1, wherein each of the first sensor electrodes are different from each of the second sensor electrodes in shape.

20. The display device of claim 12, wherein the transmitting portion has a second breadth in a second direction crossing the first direction, the second breadth being greater than or equal to a distance spanned by another plurality of first pixels of the first pixels arranged with each other along the second direction.

* * * * *